(12) United States Patent
Matsumoto

(10) Patent No.: US 9,335,807 B2
(45) Date of Patent: May 10, 2016

(54) INFORMATION PROCESSING APPARATUS, METHOD, AND STORAGE MEDIUM FOR MANAGING POWER CONSUMPTION

(75) Inventor: Tetsuya Matsumoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1287 days.

(21) Appl. No.: 13/214,060

(22) Filed: Aug. 19, 2011

(65) Prior Publication Data

US 2012/0053868 A1 Mar. 1, 2012

(30) Foreign Application Priority Data

Aug. 31, 2010 (JP) ................................ 2010-193002

(51) Int. Cl.
*G06F 3/12* (2006.01)
*G06K 15/00* (2006.01)
*H04N 1/60* (2006.01)
*H04N 1/21* (2006.01)
*G06F 1/28* (2006.01)

(52) U.S. Cl.
CPC ........................................ *G06F 1/28* (2013.01)

(58) Field of Classification Search
CPC . G06F 3/1229; G06F 3/1221; G06F 11/3013; G06F 11/3096
USPC .............................. 700/297, 286, 291; 307/80
See application file for complete search history.

(56) References Cited

U.S. PATENT DOCUMENTS

| | | | | |
|---|---|---|---|---|
| 8,717,590 B2 * | 5/2014 | Ohata | ................ | H04N 1/00896 358/1.13 |
| 8,806,241 B2 * | 8/2014 | Shimizu | ............. | G03G 15/5004 713/320 |
| 2002/0019966 A1 * | 2/2002 | Yagil | ..................... | H04L 1/0045 714/752 |
| 2007/0285713 A1 * | 12/2007 | Yamamoto | ......... | G03G 15/5004 358/1.15 |
| 2008/0005381 A1 * | 1/2008 | Theocharous | ........ | G06F 1/3203 710/18 |
| 2008/0005599 A1 * | 1/2008 | Theocharous | ........ | G06F 1/3203 713/300 |
| 2009/0082910 A1 * | 3/2009 | Sato | ........................ | G06F 1/263 700/297 |
| 2011/0231026 A1 * | 9/2011 | Yaoyama | ........... | G03G 15/5004 700/291 |
| 2011/0264418 A1 * | 10/2011 | Szewczyk | ........... | H02J 13/0006 703/2 |
| 2012/0053868 A1 * | 3/2012 | Matsumoto | ............... | G06F 1/28 702/61 |

FOREIGN PATENT DOCUMENTS

JP 2002-056728 A 2/2002
JP 2009276840 A * 11/2009

* cited by examiner

*Primary Examiner* — Akwasi M Sarpong
(74) *Attorney, Agent, or Firm* — Canon U.S.A., Inc. IP Division

(57) ABSTRACT

To determine power consumption of an image forming apparatus in each state in detail, an analysis server collects job history of a plurality of image forming apparatuses, calculates power consumption of each of the image forming apparatuses in a job processing state in a designated period by using the job history, identifies a number of times each of the image forming apparatuses has executed processing, which is performed when printing is started, in the designated period based on the job history, and adding a value obtained by multiplying job start time power consumption by the number of times of identification to the power consumption of each of the image forming apparatuses, and corrects the power consumption of each of the image forming apparatuses in the job processing state.

12 Claims, 28 Drawing Sheets

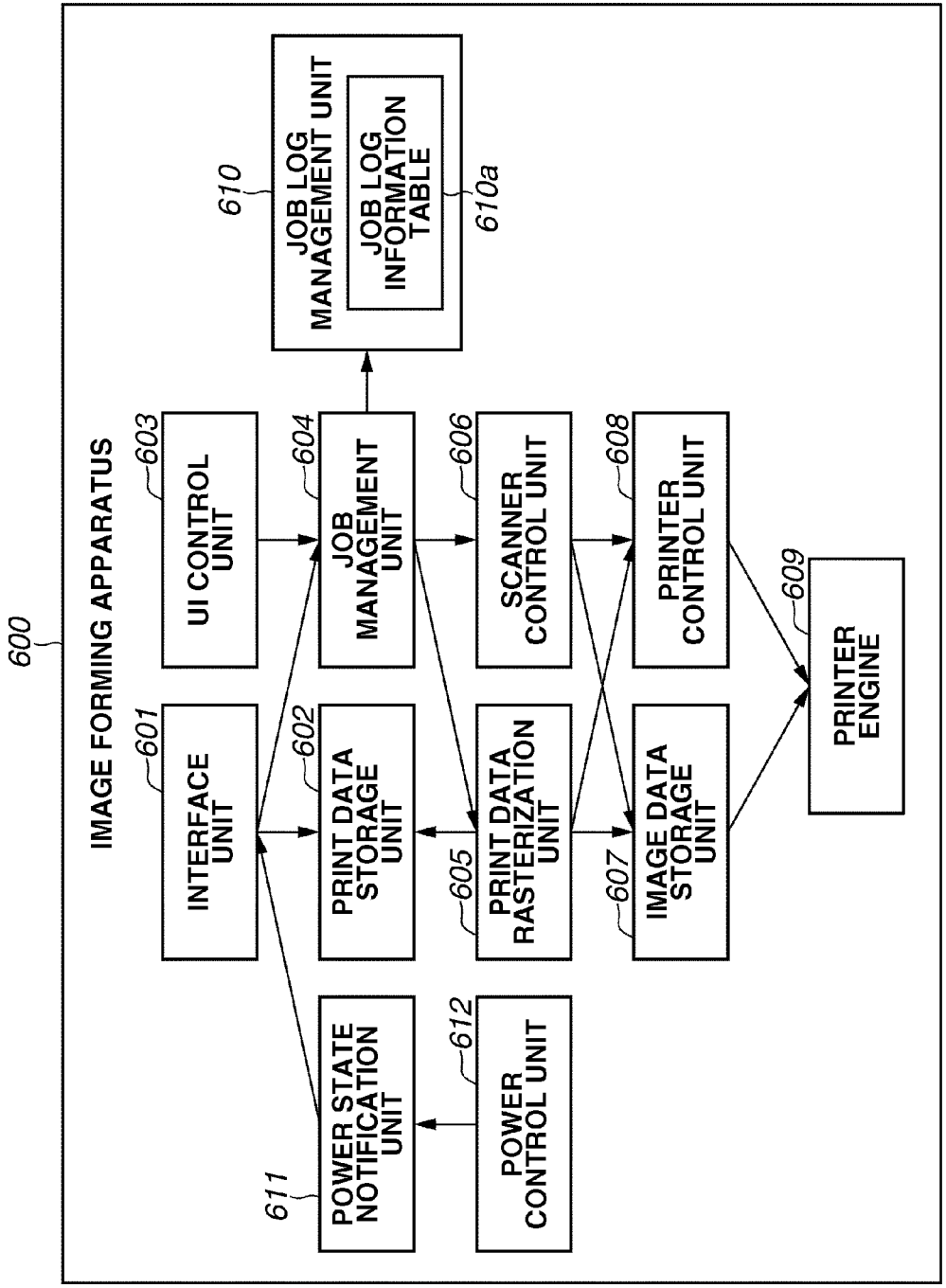

| 701 | 702 | 703 | 704 | 705 | 706 | 707 | 708 | 709 | 710 | 711 | 712 |
|---|---|---|---|---|---|---|---|---|---|---|---|
| IMAGE FORMING APPARATUS ID | IMAGE FORMING APPARATUS NAME | NORMAL MODE POWER CONSUMPTION (W) | POWER SAVING MODE POWER CONSUMPTION (W) | POWER OFF POWER CONSUMPTION (W) | JOB PROCESSING POWER CONSUMPTION (W) | PRINTING-RELATED JOB START TIME POWER CONSUMPTION (Wh) | MONOCHROME PRINTING POWER CONSUMPTION (Wh/PAGE) | COLOR PRINTING POWER CONSUMPTION (Wh/PAGE) | MONOCHROME COPY POWER CONSUMPTION (Wh/PAGE) | COLOR COPY POWER CONSUMPTION (Wh/PAGE) | SCANNING POWER CONSUMPTION (Wh/PAGE) |
| 101 | MULTIFUNCTION PERIPHERAL A | 100 | 1 | 0 | 100 | 50 | 3 | 5 | 3.2 | 5.2 | 1 |
| 102 | MULTIFUNCTION PERIPHERAL B | 130 | 3 | 0 | 130 | 70 | 4 | 6 | 4.3 | 6.3 | 1.5 |
| 103 | MULTIFUNCTION PERIPHERAL C | 120 | 1 | 0 | 120 | 55 | 3 | 5 | 3.2 | 5.2 | 1 |

| JOB LOG ID | IMAGE FORMING APPARATUS ID | JOB TYPE | START DATE AND TIME | END DATE AND TIME | NUMBER OF COLOR PAGES | NUMBER OF MONOCHROME PAGES | NUMBER OF SCANNED PAGES |
|---|---|---|---|---|---|---|---|
| 1000 | 101 | COPY | 2010/4/25 14:25:30 | 2010/4/25 14:40:30 | 10 | 0 | 10 |
| 1001 | 101 | SCAN | 2010/4/26 9:01:00 | 2010/4/26 9:01:20 | 0 | 0 | 3 |
| 1002 | 101 | COPY | 2010/4/26 9:10:00 | 2010/4/26 9:10:30 | 1 | 0 | 1 |
| 1003 | 103 | PRINT | 2010/4/26 10:12:30 | 2010/4/26 10:13:00 | 5 | 10 | 0 |

| IMAGE FORMING APPARATUS ID (901) | DATE AND TIME (902) | STATE (903) | |
|---|---|---|---|
| 101 | 2010/4/26 9:00:00 | IN OPERATION | ~905 |
| 101 | 2010/4/26 9:01:00 | JOB IN PROGRESS | ~906 |
| 101 | 2010/4/26 9:01:20 | IN OPERATION | ~907 |
| 101 | 2010/4/26 9:20:00 | TRANSITION TO POWER SAVING | ~908 |
| 101 | 2010/4/26 9:30:00 | CANCEL POWER SAVING | ~909 |
| ... | | | |
| 102 | 2010/4/26 9:00:00 | IN OPERATION | ~910 |
| 102 | 2010/4/26 9:10:00 | PRINTING-RELATED JOB IN PROGRESS | ~911 |
| 102 | 2010/4/26 9:10:30 | IN OPERATION | ~912 |
| 102 | 2010/4/26 9:20:00 | TRANSITION TO POWER SAVING | ~913 |
| 102 | 2010/4/26 9:40:00 | POWER OFF | ~914 |

FIG.10
503b

| DATE OF AGGREGATE CALCULATION 1001 | IMAGE FORMING APPARATUS ID 1002 | JOB PROCESSING TIME 1003 | NORMAL MODE TIME 1004 | POWER SAVING MODE TIME 1005 | POWER OFF TIME 1006 | PRINTING-RELATED JOB START NUMBER 1007 |
|---|---|---|---|---|---|---|
| 2010/4/26 | 101 | 0:30:46 | 8:12:03 | 4:48:04 | 10:29:07 | 16 (1008) |
| 2010/4/26 | 102 | 0:45:19 | 10:22:57 | 2:40:03 | 10:11:41 | 20 (1009) |
| 2010/4/26 | 103 | 1:10:33 | 9:44:02 | 2:16:02 | 10:45:27 | 27 (1010) |

FIG.11
_503a_

| MONTH OF AGGREGATE CALCULATION | IMAGE FORMING APPARATUS ID | JOB PROCESSING POWER CONSUMPTION (Wh) | NORMAL MODE POWER CONSUMPTION (Wh) | POWER SAVING MODE POWER CONSUMPTION (Wh) | POWER OFF POWER CONSUMPTION (Wh) |
|---|---|---|---|---|---|
| 2010/4 | 101 | 20320 | 13020 | 823 | 0 |
| 2010/4 | 102 | 40341 | 23249 | 1398 | 0 |
| 2010/4 | 103 | 65071 | 16987 | 427 | 0 |

1101　1102　1103　1104　1105　1106　1107　1108　1109

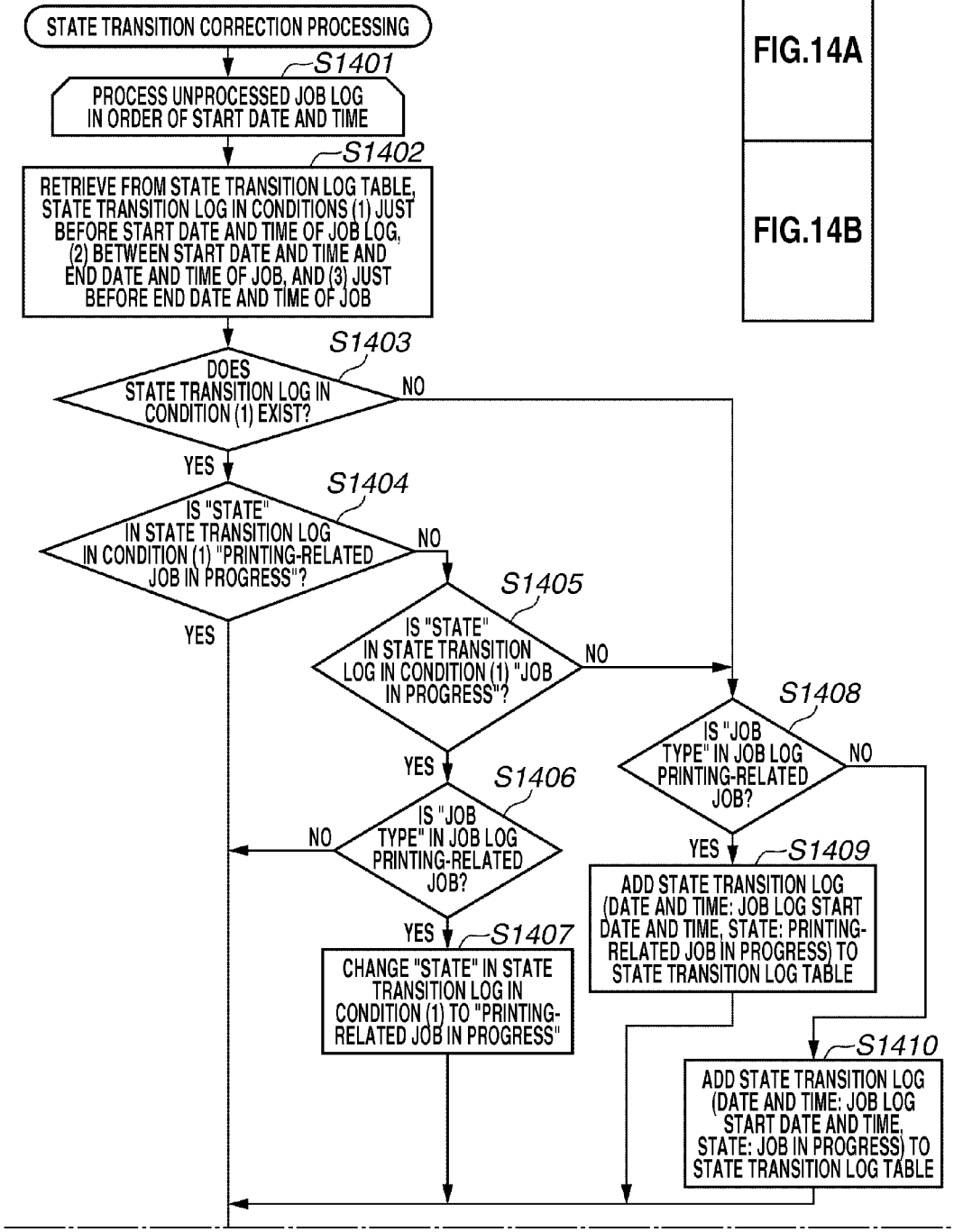

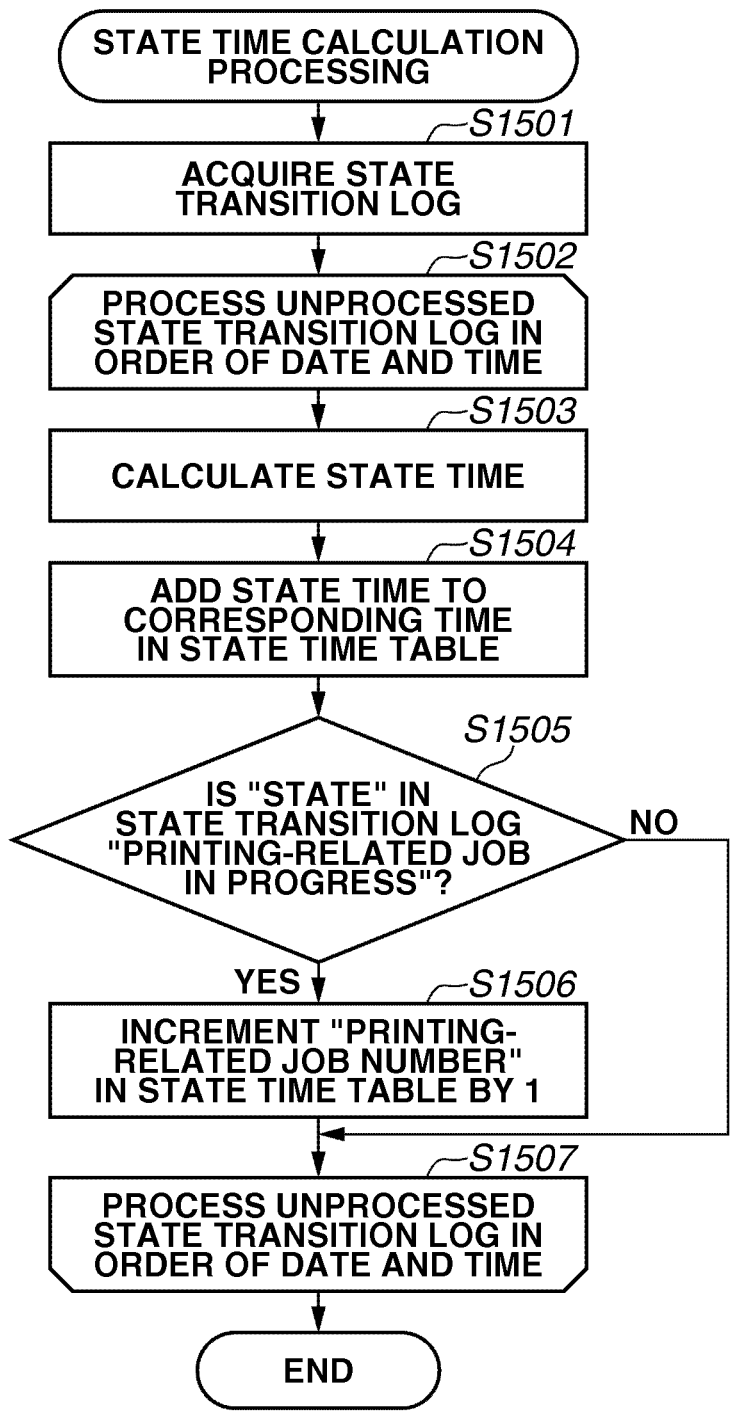

| JOB LOG ID | IMAGE FORMING APPARATUS ID | JOB TYPE | START DATE AND TIME | END DATE AND TIME | NUMBER OF COLOR PAGES | NUMBER OF MONOCHROME PAGES | NUMBER OF SCANNED PAGES | NUMBER OF STAPLES | NUMBER OF PUNCHES |
|---|---|---|---|---|---|---|---|---|---|
| 1000 | 101 | COPY | 2010/4/25 14:25:30 | 2010/4/25 14:40:30 | 10 | 0 | 10 | 2 | 0 |
| 1001 | 101 | SCAN | 2010/4/26 9:01:00 | 2010/4/26 9:01:20 | 0 | 0 | 3 | 0 | 0 |
| 1002 | 101 | COPY | 2010/4/26 9:10:00 | 2010/4/26 9:10:30 | 1 | 0 | 1 | 2 | |
| 1003 | 103 | PRINT | 2010/4/26 10:12:30 | 2010/4/26 10:13:00 | 5 | 10 | 0 | 0 | 0 |

| IMAGE FORMING APPARATUS ID (901) | DATE AND TIME (902) | STATE (903) | PRINTING-RELATED JOB START NUMBER (2101) | |
|---|---|---|---|---|
| 101 | 2010/4/26 9:00:00 | IN OPERATION | | 2102 |
| 101 | 2010/4/26 9:01:00 | JOB IN PROGRESS | 0 | 2103 |
| 101 | 2010/4/26 9:01:20 | IN OPERATION | | 2104 |
| 101 | 2010/4/26 9:20:00 | TRANSITION TO POWER SAVING | | 2105 |
| 101 | 2010/4/26 9:30:00 | CANCEL POWER SAVING | | 2106 |
| ... | | | | |
| 102 | 2010/4/26 9:00:00 | IN OPERATION | | 2107 |
| 102 | 2010/4/26 9:10:00 | PRINTING-RELATED JOB IN PROGRESS | 2 | 2108 |
| 102 | 2010/4/26 9:10:30 | IN OPERATION | | 2109 |
| 102 | 2010/4/26 9:20:00 | TRANSITION TO POWER SAVING | | 2110 |
| 102 | 2010/4/26 9:40:00 | POWER OFF | | 2111 |

FIG.22
503b

| DATE OF AGGREGATE CALCULATION 1001 | IMAGE FORMING APPARATUS ID 1002 | JOB PROCESSING TIME 1003 | NORMAL MODE TIME 1004 | POWER SAVING MODE TIME 1005 | POWER OFF TIME 1006 | PRINTING-RELATED JOB START NUMBER 1007 | NUMBER OF POWER-ON OPERATIONS 2201 | NUMBER OF POWER-OFF OPERATIONS 2202 |
|---|---|---|---|---|---|---|---|---|
| 2010/4/26 | 101 | 0:30:46 | 8:12:03 | 4:48:04 | 10:29:07 | 16 | 2 | 3 |
| 2010/4/26 | 102 | 0:45:19 | 10:22:57 | 2:40:03 | 10:11:41 | 20 | 1 | 2 |
| 2010/4/26 | 103 | 1:10:33 | 9:44:02 | 2:16:02 | 10:45:27 | 27 | 3 | 4 |

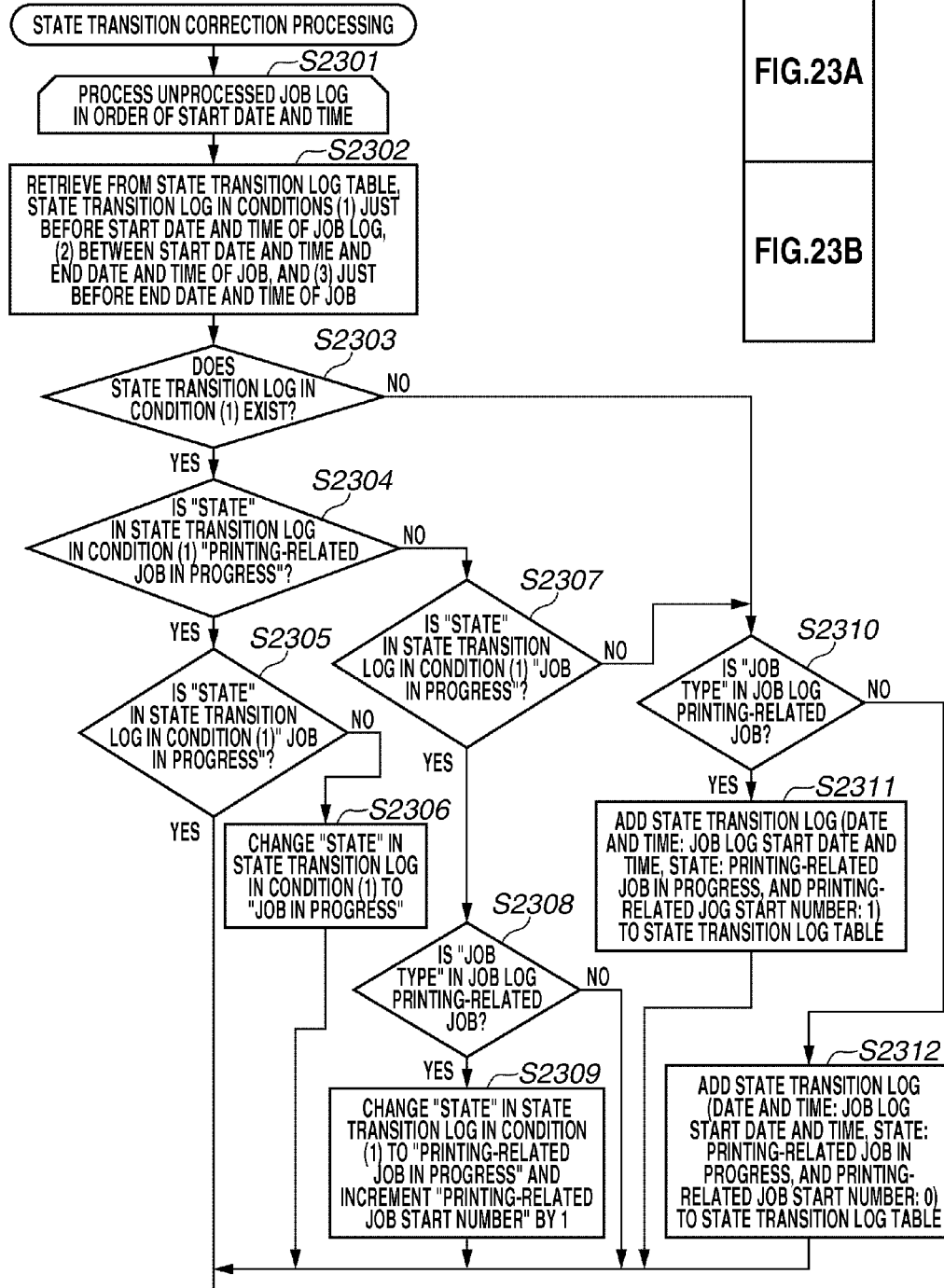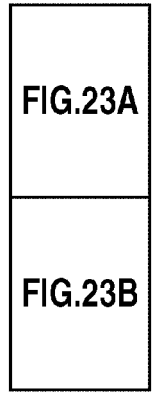

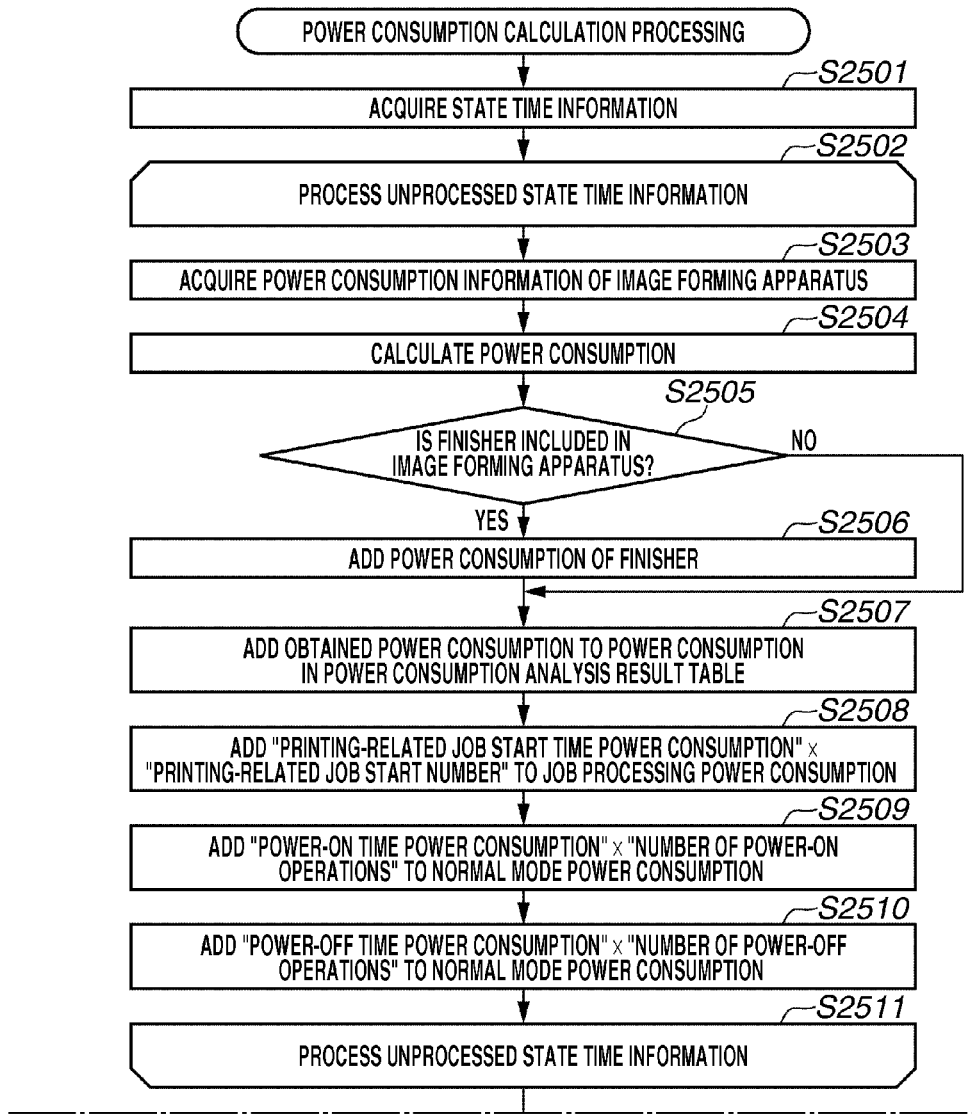

INFORMATION PROCESSING APPARATUS, METHOD, AND STORAGE MEDIUM FOR MANAGING POWER CONSUMPTION

BACKGROUND OF THE INVENTION

1. Field of the Invention

Embodiments of the present invention relate to a technique used for managing power consumption of an image forming apparatus.

2. Description of the Related Art

In recent years, there is a growing demand for reducing emissions of greenhouse gas such as carbon dioxide. Against such a background, reduction of the amount of power consumption of image forming apparatuses such as printers and multifunction peripherals is also required. Additionally, visualization of the power consumption when the image forming apparatuses are being used is also required as it helps the user recognize the amount of power which is used.

According to a technique discussed in Japanese Patent Application Laid-Open No. 2002-056728, power used by each user is calculated by multiplying the time the user uses the image forming apparatus in each mode by the power consumption of the apparatus corresponding to the mode. Thus, the power used by each user regarding the image forming apparatus may be determined.

However, according to the technique discussed in Japanese Patent Application Laid-Open No. 2002-056728, the power used by each user is calculated by multiplying the time of each mode of the image forming apparatus the user uses by the power consumption of the apparatus in each mode. Thus, the power consumption considering detailed states of the image forming apparatus may not be obtained.

For example, power consumption of the image forming apparatus due to rotation of a drum or heating of a fixing unit, or when a finisher function such as a stapling function or a punching function is used when a job is executed is not calculated.

SUMMARY OF THE INVENTION

One disclosed aspect of embodiments is directed to an information processing apparatus which allows calculation of electric power consumption of image forming apparatuses considering more detailed states of the apparatuses, and thus allows calculation of electric power consumption of each of the image forming apparatuses according to its state.

According to an aspect of the embodiments, an information processing apparatus which calculates electric power consumption of a plurality of image forming apparatuses includes a first generation unit configured to generate a display screen used for displaying a map image on which a plurality of icons that represent installation positions of the plurality of image forming apparatuses are arranged, and a second generation unit configured to, if designation regarding one of the plurality of image forming apparatuses is accepted via the display screen, generate a display screen used for displaying more detailed information of the electric power consumption of the designated image forming apparatus considering a plurality of possible states of the image forming apparatus in addition to the map image. The first generation unit generates said display screen used for displaying a chart (e.g., a pie chart, a circle graph) illustrating a ratio of electric power consumption of each of the image forming apparatuses in each state so that the chart is arranged in a position corresponding to each icon on the map image and a size of the chart corresponds to an amount of the electric power consumption of the image forming apparatus, and the designation of the image forming apparatus via the display screen is designation of the icon or the chart on the map image.

According to another aspect of the embodiments, an information processing apparatus which calculates electric power consumption of one or a plurality of image forming apparatuses includes a storage unit configured to store start time power consumption indicating electric power consumption of processing when a job of the image forming apparatus is started, a collection unit configured to collect job history of a job executed by the image forming apparatus from the image forming apparatus, an electric power consumption calculation unit configured to calculate electric power consumption of the image forming apparatus in a job processing state in a designated period by using the job history, an identification unit configured to identify a number of times the image forming apparatus has executed a starting process which is performed when printing is started in the designated period based on the job history, and a correction unit configured to correct a value of the electric power consumption calculated by the electric power consumption calculation unit by adding a value obtained by multiplying the start time power consumption by the identified number of times to the electric power consumption of the image forming apparatus in the job processing state.

Further features and aspects of the embodiments will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 is a block diagram illustrating an example of a data processing configuration of the multifunction peripheral.

FIG. 7 illustrates an example of an image forming apparatus power consumption table according to a first exemplary embodiment of the present invention.

FIG. 8 illustrates an example of a job log table according to the first exemplary embodiment.

FIG. 9 illustrates an example of a state transition log table according to the first exemplary embodiment.

FIG. 10 illustrates an example of a state time table according to the first exemplary embodiment.

FIG. 11 illustrates an example of a power consumption analysis result table according to the first exemplary embodiment.

FIG. 15 is a flowchart illustrating an example of state time calculation processing according to the first exemplary embodiment.

FIG. 20 illustrates an example of the job log table according to the second exemplary embodiment.

FIG. 21 illustrates an example of the state transition log table according to the second exemplary embodiment.

FIG. 22 illustrates an example of the state time table according to the second exemplary embodiment.

DESCRIPTION OF THE EMBODIMENTS

Various exemplary embodiments, features, and aspects of the invention will be described in detail below with reference to the drawings.

One disclosed feature of the embodiments may be described as a process which is usually depicted as a flowchart, a flow diagram, a timing diagram, a structure diagram, or a block diagram. Although a flowchart or a timing diagram may describe the operations or events as a sequential process, the operations may be performed, or the events may occur, in parallel or concurrently. In addition, the order of the operations or events may be re-arranged. A process is terminated when its operations are completed. A process may correspond to a method, a program, a procedure, a method of manufacturing or fabrication, a sequence of operations performed by an apparatus, a machine, or a logic circuit, etc.

Figure 1:
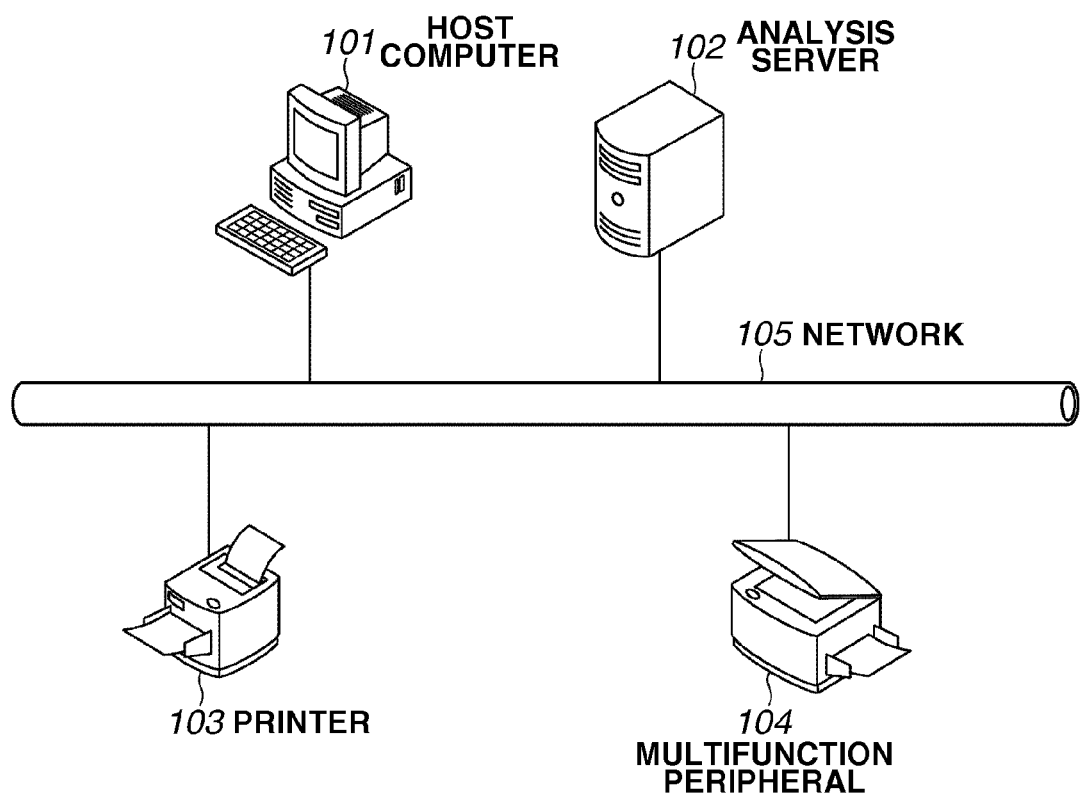
FIG. 1 is a schematic diagram illustrating a configuration of a management system which manages electric power consumption of one or more image forming apparatuses according to an exemplary embodiment of the present invention.

FIG. 1 is a schematic diagram illustrating a configuration of a management system which manages electric power consumption of one or more image forming apparatuses according to an exemplary embodiment of the present invention.

In FIG. 1, a host computer 101 is an apparatus which a user uses in generating image data. The host computer 101 transmits a print job to image forming apparatuses being a printer 103 and a multifunction peripheral 104. The host computer 101 includes hardware resources described below and software resources including an operating system (OS) and a printer driver. The host computer 101 is connected to the printer 103 and the multifunction peripheral 104 by a network 105 and may communicate with them by a predetermined protocol.

The printer 103 is an image forming apparatus that receives print data via the network 105 and prints the data on paper according to a known print technique such as electrophotography or the ink jet technique.

The multifunction peripheral 104 is an image forming apparatus that receives print data via the network 105 and prints the data on paper according to a known print technique such as electrophotography or the ink jet technique. Further, the multifunction peripheral 104 scans a paper document by a scanner and makes a copy of the document or converts the data into image data. The obtained data may be transmitted by an electronic mail. The multifunction peripheral 104 also has a function to send/receive a facsimile. A printer without a copy function may also be used as the multifunction peripheral 104.

An analysis server 102 analyzes power consumption of the printer 103 and the multifunction peripheral 104. The host computer 101, the multifunction peripheral 104, the printer 103, and the analysis server 102 are connected via the network 105 by a known technique such as Ethernet and may communicate with one another.

According to the present embodiment, although the analysis server 102 is provided in addition to the printer 103 and the multifunction peripheral 104, a module having a function of the analysis server may be included in the printer 103 and the multifunction peripheral 104. If such a module is used, the network communication between the analysis server 102 and the printer 103 or the multifunction peripheral 104 may be replaced by data exchange performed via the system bus.

Figure 2:
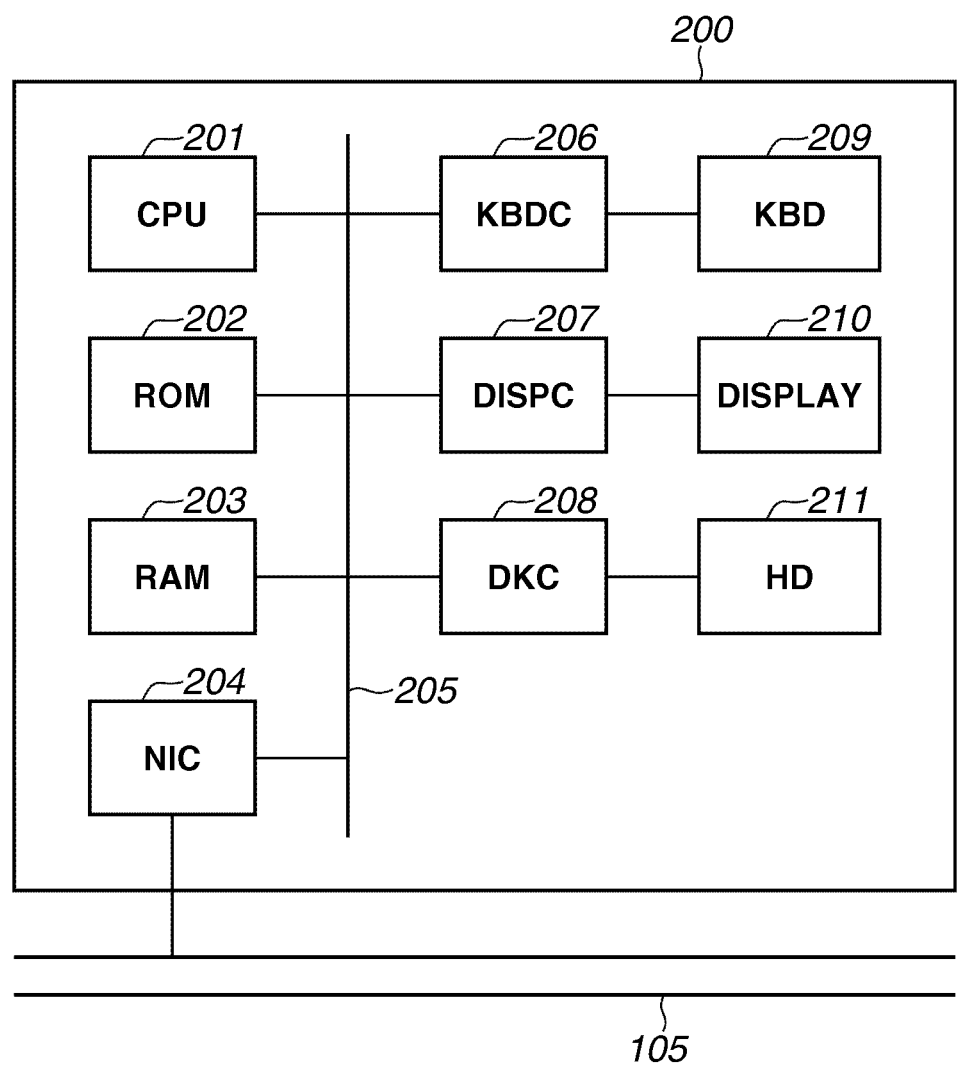
FIG. 2 is a block diagram illustrating an example of an inner configuration of an information processing apparatus (computer) included in a host computer and an analysis server.

FIG. 2 is a block diagram illustrating an example of an inner configuration of an information processing apparatus (computer) included in the host computer 101 and the analysis server 102.

In FIG. 2, a PC 200 corresponds to the computer as a whole. The PC 200 includes a CPU 201. The CPU 201 executes software stored in a ROM 202 or in a mass storage unit such as a hard disk (HD) 211. The CPU 201 performs overall control of each device connected to a system bus 205. A RAM 203 functions as a main memory and a work area of the CPU 201.

A network interface card (NIC) 204 is used when data is exchanged with other nodes via the network 105.

A keyboard controller (KBDC) 206 controls input of instructions given by a user of the information processing apparatus via a keyboard (KBD) 209 or a pointing device (not shown) of the PC. A display controller (DISPC) 207 controls display of a display module (DISPLAY) 210 including, for example, a liquid crystal display. A disk controller (DKC) 208 controls the HD 211 being a mass storage unit. Although the HD 211 is illustrated in FIG. 2, the unit is not limited to a hard disk and may be, for example, a flash memory drive (solid state drive: SSD).

Figure 3:
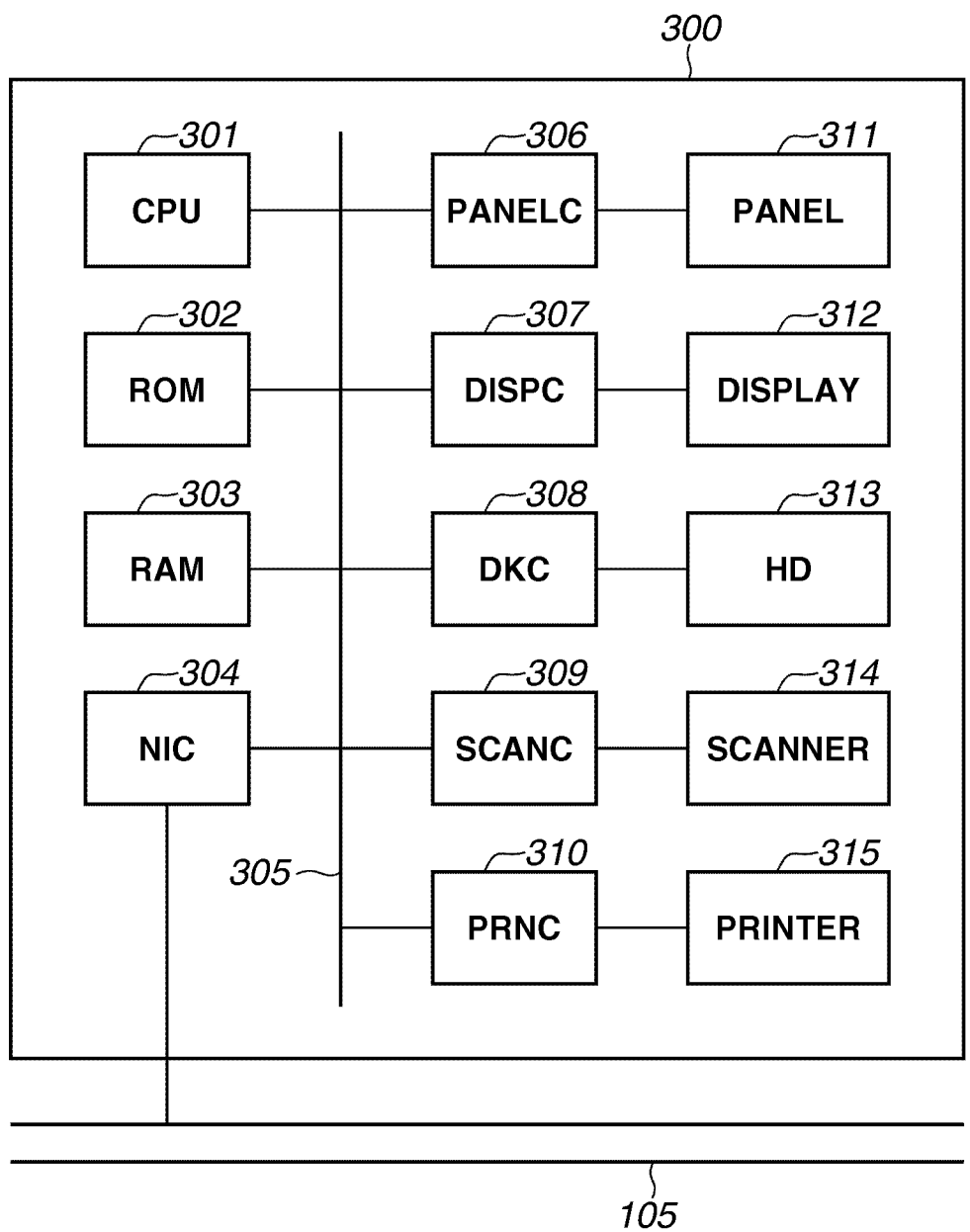
FIG. 3 is a block diagram illustrating an example of an inner configuration of a multifunction peripheral.

FIG. 3 is a block diagram illustrating an example of an inner configuration of the multifunction peripheral 104 illustrated in FIG. 1.

In FIG. 3, a multifunction peripheral 300 corresponds to the multifunction peripheral as a whole. The multifunction peripheral 300 includes a CPU 301 which executes software stored in a ROM 302 or in a mass storage unit such as a HD 313. The CPU 301 performs overall control of each of the image forming units connected to a system bus 305. A RAM 303 functions as a main memory and a work area of the CPU 301.

A network interface card (NIC) 304 is used when data is exchanged with other nodes via the network 105.

A panel controller (PANELC) 306 controls input of instructions given by a user of the multifunction peripheral via an operation panel (PANEL) 311 of the multifunction peripheral. A display controller (DISPC) 307 controls display of a display module (DISPLAY) 312 including, for example, a liquid crystal display.

A disk controller (DKC) 308 controls a hard disk (HD) 313 being a mass image storage unit. Although the HD 313 is used as the mass image storage unit in FIG. 2, the unit is not limited to a hard disk and may be, for example, a flash memory drive (solid state drive: SSD).

A scanner controller (SCANC) 309 controls an optical scanner unit (scanner) 314 included in the multifunction peripheral when the scanner scans a paper document. A printer controller (PRNC) 310 controls a printer unit (printer) 315 included in the multifunction peripheral when the printer performs printing on paper using a known print technique such as electrophotography or the ink jet technique.

The inner configuration of the printer 103 illustrated in FIG. 1 may be considered as the above-described inner configuration of the multifunction peripheral 104 excluding the scanner controller (SCANC) 309 and the optical scanner unit (scanner) 314. Further, it may be the inner configuration of the multifunction peripheral 104 further excluding the panel controller (PANELC) 306, the operation panel (PANEL) 311, the display controller (DISPC) 307, and the display module (DISPLAY) 312.

Figure 4:
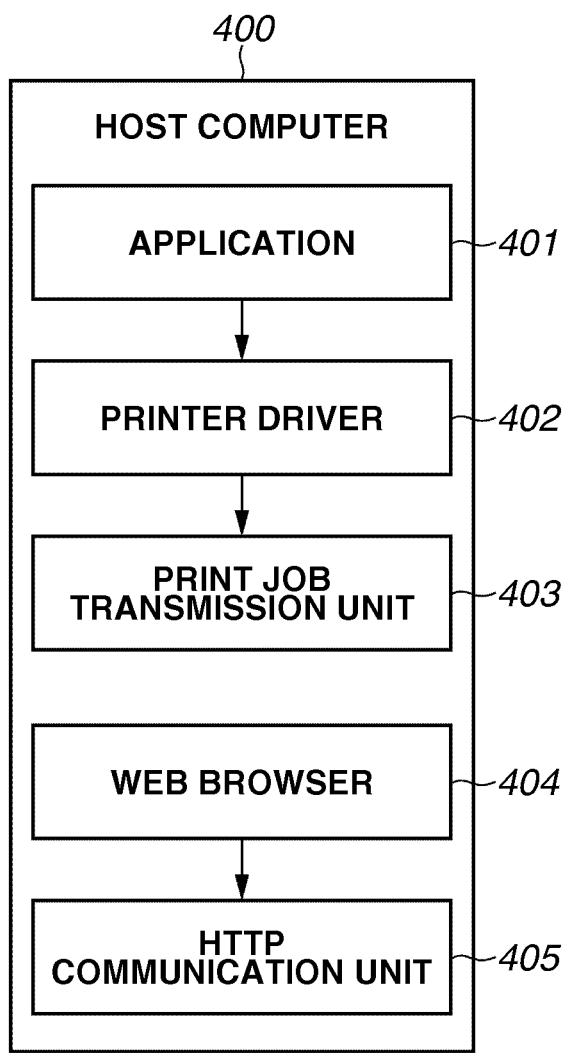
FIG. 4 is a block diagram illustrating an example of a functional configuration of a host computer.

FIG. 4 is a block diagram illustrating an example of a functional configuration of the host computer 101 illustrated in FIG. 1.

In FIG. 4, a host computer 400 corresponds to the host computer as a whole. A print application 401 gives a print instruction. The print application 401 gives a print instruction by sending a rendering instruction to a printer driver 402.

The printer driver 402 converts the rendering instruction sent from the print application 401 into print data. The print data is in PDL (page-description language) and thus may be interpreted by the multifunction peripheral. Further, the printer driver 402 operates the print application 401, adds the user ID of the user who has given the printing instruction as job owner information, generates a print job, and sends the generated print job to a print job transmission unit 403.

The print job transmission unit 403 transmits the print job sent from the printer driver 402 to the multifunction peripheral 104. A web browser 404 interprets the HTML data, performs rendering on the screen of the display module 210, accepts a user operation sent from a keyboard or the like, and sends a request to a hypertext transfer protocol (HTTP) communication unit 405.

Upon receiving the request from the web browser, the HTTP communication unit 405 communicates with the printer 103, the multifunction peripheral 104, or the analysis server 102 via the NIC 204 according to a protocol such as HTTP or a HTTP over secure socket layer (HTTPS) and transmits a request for a web page and receives webpage data.

Each of the function units (401 to 405) of the above-described host computer 101 is realized by the CPU 201 of the host computer 101 loading a control program from the HD 211 onto the RAM 203 and executing the program.

Figure 5:
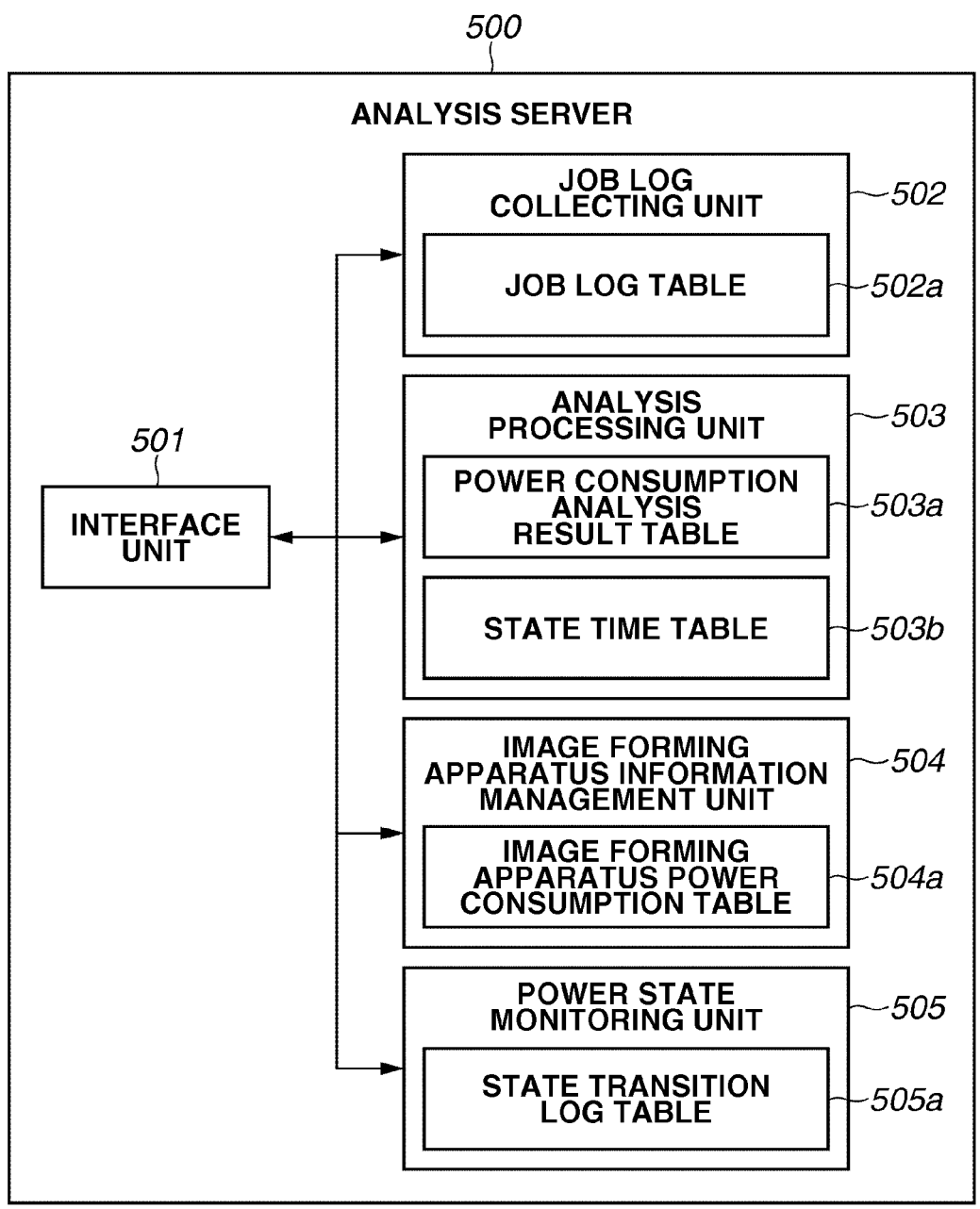
FIG. 5 is a block diagram illustrating an example of a functional configuration of an analysis server.

FIG. 5 is a block diagram illustrating an example of a functional configuration of the analysis server 102 illustrated in FIG. 1. In FIG. 5, an analysis server 500 corresponds to the analysis server as a whole. An interface unit 501 communicates with the host computer 101, the printer 103, and the multifunction peripheral 104 through the NIC 204 illustrated in FIG. 2 via the network 105.

A job log collecting unit 502 collects job log information (job history), which is managed by a job log management unit 610 (see FIG. 6) of the printer 103 or the multifunction peripheral 104 at regular intervals, via the interface unit 501 and stores the information in a job log table 502a (see FIG. 8). The job log collecting unit 502 may also store the job log information if the job log information is transmitted from the printer 103 or the multifunction peripheral 104.

An analysis processing unit 503 performs analysis processing of the power consumption of the image forming apparatus or the calculation processing of the time of each state based on the job log information or the state transition log information and stores the obtained analysis processing result or the calculation result in an electric power consumption analysis result table 503a (see FIG. 11) or a state time table 503b (see FIG. 10).

Further, the analysis processing unit 503 includes a display screen generation function. According to this function, a display screen used for displaying a power consumption analysis result graph such as the one illustrated in FIG. 17 or 18 below is generated based on the electric power consumption analysis result table 503a. Further, the analysis processing unit 503 transmits the generated display screen to the web browser 404 of the host computer 101 via the interface unit 501 according to a protocol such as HTTP or HTTPS. The analysis processing unit 503 may be configured such that a display screen, such as the one illustrated in FIG. 17 or 18 below, is displayed on the display module (DISPLAY) 210 of the analysis server 102.

An image forming apparatus information management unit 504 stores power consumption information of the image forming apparatus in an image forming apparatus power consumption table 504a (see FIG. 7). Further, the image forming apparatus information management unit 504 acquires capability information or configuration information from the printer 103 or the multifunction peripheral 104 via the interface unit 501 and stores the information in the image forming apparatus power consumption table 504a.

A power state monitoring unit 505 receives a power state notification from the printer 103 or the multifunction peripheral 104 via the interface unit 501, generates a state transition log, and stores the log in a state transition log table 505a (see FIG. 9).

Each of the function units (501 to 505) of the above-described analysis server 102 is realized by the CPU 201 of the analysis server 102 loading a control program from the HD 211 onto the RAM 203 and executing the program. Further, the substance of each of the above-described tables 502a, 503a, 503b, 504a, and 505a is stored in the HD 211 of the analysis server 102.

FIG. 6 is a block diagram illustrating an example of a data processing configuration of the multifunction peripheral 104 illustrated in FIG. 1. In FIG. 6, an image forming apparatus 600 corresponds to the image forming apparatus (the multifunction peripheral 104) as a whole. An interface unit 601 is connected to the network 105 and receives a print job from the host computer 101. A print data storage unit 602 temporarily stores print data of the print job.

A user interface (UI) control unit 603 controls the operation panel (PANEL) 311 via the panel controller (PANELC) 306. Further, the UI control unit 603 accepts copy instructions and scan transmission instructions given by the user to the multifunction peripheral 104.

A job management unit 604 analyzes the print job transmitted from the host computer 101 and acquires output attribute information such as the user name, the number of pages to be printed, or whether color printing is to be performed. The job management unit 604 puts the acquired information together with start date and time information and manages the information as job information.

A print data rasterization unit 605 performs image generation processing after acquiring the print data from the print data storage unit 602 according to the job information stored in the job management unit 604. The generated image data is stored in the RAM 303.

A scanner control unit 606 controls the scanner controller 309, scans a paper document, and generates image data. If an automatic document feeder (ADF) or a reverse document feeder (RDF) is connected to the multifunction peripheral as a document feeder, the scanner control unit 606 controls the feed and the discharge of the ADF or the RDF. Further, if a two-sided document is scanned, the scanner control unit 606 performs document reverse control.

An image data storage unit 607 temporarily stores the image data generated by the print data rasterization unit 605 and the scanner control unit 606. A printer control unit 608 controls a printer engine 609 so that the image data stored in the image data storage unit 607 is printed by the printer engine 609. The printer engine 609 actually prints the image data stored in the image data storage unit 607 on a medium such as paper according to a known print technique such as electrophotography or the ink jet technique.

The job log management unit 610 stores and manages the job log information according to a job log information table 610a. When a job is completed, the job management unit 604 transmits job information of the completed job to the job log management unit 610 as job log information. The job log information transmitted from the job management unit 604 is stored in a job log information table of the job log management unit 610. Further, if the job log management unit 610 receives a request from the analysis server 102, the job log management unit 610 transmits the job log information to the analysis server 102.

A power source control unit 612 controls the power of the image forming apparatus 600 and manages the power states of the image forming apparatus 600. The power states are the normal mode, the power saving mode (operation mode), and power off. The power consumption in the power saving mode is smaller than the power consumption in the normal mode. The power saving mode controlled by the power source control unit 612 may include a plurality of stages. The power saving mode may be set for each configuration module of the printer 103 and the multifunction peripheral 104.

Further, the power source control unit 612 may control the image forming apparatus 600 so that the power state of the apparatus is changed according to various conditions. For example, the power source control unit 612 changes the mode of the image forming apparatus 600 from the normal mode to the power saving mode if the image forming apparatus 600 is not operated for a certain period of time, a print job or a facsimile is not received, and a command is not transmitted from the network.

Further, when the image forming apparatus 600 is in the power saving mode, if an instruction for operation of the image forming apparatus 600 is given, a print job or a facsimile is received, or a command is transmitted from the network, the power source control unit 612 changes the mode to the normal mode. When the power source control unit 612 changes the power state, it notifies a power state notification unit 611 of the change.

When the power state notification unit 611 receives the power state change notification described above from the power source control unit 612, the power state notification unit 611 notifies the power state of the image forming apparatus 600 to an external apparatus (e.g., the analysis server 102) via the interface unit 601. The power state notification unit 611 also notifies the external apparatus of the power state at regular intervals even when the image forming apparatus is operating in the normal mode. The types of the power state notified by the power state notification are "in operation", "transition to power saving mode", "cancel power saving mode", "power on", and "power off".

The notification of "in operation" is given at regular intervals when the image forming apparatus 600 is operating in the normal mode. The notification of "transition to power saving mode" is given when the mode of the image forming apparatus 600 is changed from the normal mode to the power saving mode. The notification of "cancel power saving mode" is given when the mode of the image forming apparatus 600 is changed from the power saving mode to the normal mode. The notification of "power on" is given when power is supplied to the image forming apparatus 600 and the state of the apparatus is changed from the power off state to the normal mode. The notification of "power off" is given when the state of the image forming apparatus 600 is changed to the power off state.

The notification may be given via the interface unit 601 according to a dedicated protocol or a publicly known protocol. Further, the power state of the image forming apparatus 600 may be notified to the analysis server 102, which is designated in advance, but may be notified to a plurality of apparatuses by multicast or broadcast.

If the printer 103 does not include a scanner, the configuration of the printer may be considered as the configuration of the image forming apparatus 600 illustrated in FIG. 6 without the scanner control unit 606 and the UI control unit 603.

The job log management unit 610 and the power state notification unit 611 described above are function units which are realized by the CPU 301 of the image forming apparatus loading a control program in the ROM 302 onto the RAM 303 and executing the program. Further, the substance of the above-described job log information table 610a is stored in the HD 313 of the image forming apparatus.

FIG. 7 illustrates an example of the image forming apparatus power consumption table 504a of the image forming apparatus information management unit 504 illustrated in FIG. 5 according to a first exemplary embodiment.

In FIG. 7, a column 701 labeled "image forming apparatus ID" indicates an ID used for uniquely identifying an image forming apparatus in the system. A column 702 labeled "image forming apparatus name" indicates a name of the image forming apparatus.

A column 703 labeled "normal mode power consumption" indicates power consumption (W) of the image forming apparatus in the normal mode per unit time. A column 704 labeled "power saving mode power consumption" indicates power consumption (W) of the image forming apparatus in the power saving mode per unit time. A column 705 labeled "power off power consumption" indicates power consumption (W) of the image forming apparatus in the power off state per unit time.

A column 706 labeled "job in progress power consumption" indicates power consumption (W) of the image forming apparatus in the job in progress mode per unit time. The job in progress power consumption is the power which is used when a job is being processed regardless of the job attribute. It is also the power which is used even when processing of a job is stopped, for example, by an error.

A column 707 labeled "printing-related job start time power consumption" indicates the power consumption (Wh) of the image forming apparatus when a printing-related job of the image forming apparatus is started. The printing-related job is a job that includes output of paper and is, for example, printing and copying. The operation of the printing-related job includes rotation of the drum or heating of the fixing unit. If the power consumption at the time the job is started depends on the output condition of the job type, the power consumption for each of the output conditions when each of the jobs is started is recorded in the table.

Further, the image forming apparatus power consumption table 504a includes power consumption per page of a job when a plurality of output conditions, which have different power consumption when a job is output, are combined. According to the present embodiment, examples of power consumption per page of a job which are obtained under a combination of a job type and a color mode are indicated in columns 708 to 712.

The column 708 labeled "monochrome printing power consumption" indicates the power consumption per page (Wh/page) when the job type of the image forming apparatus is "print" and the color mode is "monochrome". The column 709 labeled "color printing power consumption" indicates the power consumption per page (Wh/page) when the job type of the image forming apparatus is "print" and the color mode is "color".

The column 710 labeled "monochrome copy power consumption" indicates power consumption per page (Wh/page) when the job type of the image forming apparatus is "copy" and the color mode is "monochrome". The column 711 labeled "color copy power consumption" indicates the power consumption per page (Wh/page) when the job type of the image forming apparatus is "copy" and the color mode is "color".

The column 712 labeled "scanning power consumption" indicates the power consumption per page (Wh/page) when the job type of the image forming apparatus is "scanning". The scanning power consumption also indicates the power consumption per page when a document is scanned for the copy operation. Thus, the columns 708 to 712 indicate the power consumption according to the type of the job.

Thus the power consumption of the image forming apparatus is recognized by referring to the information managed by the image forming apparatus information management unit 504 (the information in the columns 701 to 712). Further, each of rows 713 and 714 show power consumption information of the image forming apparatus.

For example, the image forming apparatus power consumption information in the row 713 indicates that "the power consumption of a multifunction peripheral A is 100 W in normal mode, 1 W in power saving mode, 0 W when power is off, 50 Wh when a printing-related job is started, 3 Wh/page when monochrome printing is being performed, 5 Wh/page when color printing is being performed, 3.2 Wh/page when monochrome copying is being performed, 5.2 Wh/page when color copying is being performed, and 1 Wh/page when scanning is being performed".

Further, the image forming apparatus power consumption information in the row 714 indicates that "the power consumption of a multifunction peripheral B is 130 W in normal mode, 3 W in power saving mode, 0 W when power is off, 70 Wh when a printing-related job is started, 4 Wh/page when monochrome printing is being performed, 6 Wh/page when color printing is being performed, 4.3 Wh/page when monochrome copying is being performed, 6.3 Wh/page when color copying is being performed, and 1.5 Wh/page when scanning is being performed".

The initial value of each setting value of the image forming apparatus power consumption table 504a may be determined according to the model of the image forming apparatus. The model name of the image forming apparatus may be acquired from each image forming apparatus by the image forming apparatus information management unit 504 via the network 105 according to a protocol such as simple network management protocol (SNMP). The image forming apparatus information management unit 504 may be configured such that, at the time the model name is acquired, each setting value of the image forming apparatus power consumption table is also acquired from each image forming apparatus by the image forming apparatus information management unit 504 via the network 105. Further, each setting value of the image forming apparatus power consumption table may be designated/changed by an input device of the analysis server 102 such as the KBD 209 or a web browser screen of the host computer 101 connected to the image forming apparatus via the network 105.

FIG. 8 illustrates an example of the job log table 502a of the job log collecting unit 502 illustrated in FIG. 5 according to the first exemplary embodiment.

In FIG. 8, a column 801 labeled "job log ID" indicates an ID used for uniquely identifying a job log in the system. A column 802 labeled "image forming apparatus ID" indicates an ID of the image forming apparatus that processed the job. A column 803 labeled "job type" indicates the type of the job. The job types include, "print" being printing of a document transmitted from the host computer, "copy", "scan" and "box print" being printing of a document stored in the multifunction peripheral.

A column 804 labeled "start date and time" indicates the start date and time of the job processing. A column 805 labeled "end date and time" indicates the end date and time of the job processing. A column 806 labeled "number of color pages" indicates the number of color pages printed by the job. A column 807 labeled "number of monochrome pages" indicates the number of monochrome pages printed by the job. A column 808 labeled "number of scanned pages" indicates the number of pages scanned by the job. In other words, the columns 806 to 808 provide information indicating the number of pages processed according to each job processing operation. Further, the number of color scanned pages and the number of monochrome scanned pages may be presented separately for the column 808 labeled "number of scanned pages".

According to the information in the columns 801 to 808, information regarding which job has been started and completed at which date and time by which image forming apparatus is recorded as job log information (rows 809 to 812).

For example, the job log in the row 809 indicates that "a copy job has been executed by an image forming apparatus of ID 101 starting at "2010/4/25 14:25:30" and ended at "2010/4/25 14:40:30"". Further, it is understood that "the number of the scanned pages is 10 and the color printing of 10 pages has been performed" according to the job. The job log table may be generated for each job type.

FIG. 9 illustrates an example of the state transition log table 505a of the power state monitoring unit 505 illustrated in FIG. 5 according to the first exemplary embodiment.

The state transition log table 505a is used for recording a log of state transitions of the image forming apparatus which are calculated based on the power state notification and the job log. The state transition to "job in progress" of the state transition log table 505a is separated into "printing-related job in progress" and "job in progress" when it is recorded.

The "printing-related job in progress" indicates that a job related to printing (e.g., printing and copying) is being processed. The "job in progress" indicates that a job not related to printing is being processed. The job corresponding to the "printing-related job in progress" includes, for example, rotation of the drum or heating of the fixing unit. The jobs corresponding to the "job in progress" does not include rotation of the drum or heating of the fixing unit.

In FIG. 9, a column 901 labeled "image forming apparatus ID" indicates an ID of the image forming apparatus whose state has been changed. A column 902 labeled "date and time" indicates the date and time of the transition. The data and time in the column 902 is set by power state notification reception processing described below with reference to FIG. 12 or state transition correction processing described below with reference to FIG. 14. A column 903 labeled "state" indicates the state after the transition. The state in the column 903 is set by the power state notification reception processing described below with reference to FIG. 12 or the state transition correction processing described below with reference to FIG. 14. According to the power state notification reception processing described below with reference to FIG. 12, "in operation", "transition to power saving", "cancel power saving", "power off", "power on" are set in the column 903. Further, in the state transition correction processing described below with reference to FIG. 14, "job in progress" and "printing-related job in progress" are set in the column 903.

According to the information in the columns 901 to 903, a state transition log of the state of each of the image forming apparatuses is recorded in rows 905 to 914.

For example, the state transition log of the row 911 indicates that "the state of an image forming apparatus ID 102 is changed to "printing-related job in progress" at "2010/4/26 9:10:00"".

FIG. 10 illustrates an example of the state time table 503b of the analysis processing unit 503 illustrated in FIG. 5 according to the first exemplary embodiment. The state time table 503b is used for recording the time of the image forming apparatus in each state which is calculated using the state transition log.

In FIG. 10, a column 1001 labeled "date of aggregate calculation" indicates the date of aggregate calculation of the corresponding row. Although the column 1001 is presented on a day-to-day basis, it may also be presented on an hourly basis or a monthly basis.

A column 1002 labeled "image forming apparatus ID" indicates the ID of the image forming apparatus whose calculation has been performed.

A column 1003 labeled "job processing time" indicates a total of the job processing time of the image forming apparatus on the date of aggregate calculation of each of the corresponding rows. A column 1004 labeled "normal mode time" indicates a total of the normal mode time of the image forming apparatus on the date of aggregate calculation of each of the corresponding rows. A column 1005 labeled "power saving mode time" indicates a total of the power saving mode time of the image forming apparatus on the date of aggregate calculation of each of the corresponding rows. A column 1006 labeled "power off time" indicates a total of the power off time of the image forming apparatus on the date of aggregate calculation of each of the corresponding rows.

A column 1007 labeled "printing-related job start number" indicates a number of times the state of the column 903 has been changed to "printing-related job in progress" in the state transition log table 505a (FIG. 9) with respect to the corresponding image forming apparatus on the date of aggregate calculation.

In other words, the above-described columns 1003 to 1006 indicate a total time of the image forming apparatus of the corresponding row performing a job in the normal mode (standby), in the power saving mode (power saving state), and in the power off state on the date of aggregate calculation in the column 1001. Further, the column 1007 indicates the number of times processing, which is performed when printing of a job is started (i.e., processing such as rotation of the drum or heating of the fixing unit), is started. In other words, the column 1007 indicates the number of times printing is started on the date in the column 1001.

Each of rows 1008 to 1010 indicates state time information. For example, the row 1008 indicates that "the processing hours of the image forming apparatus of ID 101 on "2010/4/26" are "job processing time": "30 minutes 46 seconds", "normal mode time": "8 hours 12 minutes 3 seconds", "power saving mode time": "4 hours 48 minutes 4 seconds", and "power off time": "10 hours 29 minutes 7 seconds"". Further, "the number of state transition logs of "printing-related job in progress" of the state in the column 903 is 16 regarding the image forming apparatus of ID 101 on "2010/4/26" with respect to the state transition log".

The state time table 503b is updated by the analysis processing unit 503 at regular intervals, for example, by the day, hour, or month. Further, the state time table 503b generated for each aggregate calculation period (e.g., by the month, hour, or day) may be included in the analysis processing unit 503.

FIG. 11 illustrates an example of the electric power consumption analysis result table 503a of the analysis processing unit 503 illustrated in FIG. 5. The electric power consumption analysis result table 503a records an analysis result of the power consumption of the image forming apparatus which has been calculated according to the state time information, the power consumption information of the image forming apparatus, and the job log.

In FIG. 11, a column 1101 labeled "month of aggregate calculation" indicates which month the calculation result of the corresponding row corresponds to. According to the present exemplary embodiment, although the column 1101 is on a monthly basis, by changing the period of calculation (designation period), it may be performed on an hourly basis or on a daily basis. A column 1102 labeled "image forming apparatus ID" indicates the ID of the image forming apparatus.

A column 1103 labeled "job processing power consumption" indicates the power consumption (Wh) of the image forming apparatus of the corresponding row of the corresponding month according to the job processing. A column 1104 labeled "normal mode power consumption" indicates the power consumption (Wh) of the image forming apparatus of the corresponding row of the corresponding month in the normal mode. A column 1105 labeled "power saving mode power consumption" indicates the power consumption (Wh) of the image forming apparatus of the corresponding row of the corresponding month in the power saving mode. A column 1106 labeled "power off power consumption" indicates the power consumption (Wh) of the image forming apparatus of the corresponding row of the corresponding month when the power is off. In other words, the above-described columns 1103 to 1106 indicate power consumption of the image forming apparatus of the corresponding row performing a job, in the normal mode (standby), in the power saving mode (power saving state), and in the power off state on the date in the column 1101.

Further, each of rows 1107 to 1109 indicates power consumption analysis result information. For example, the row 1107 indicates that "the power consumption of the image forming apparatus of ID 101 on April 2010 is "job in progress power consumption": 20320 Wh, "normal mode power consumption": 13020 Wh, "power saving mode power consumption": 823 Wh, and "power off power consumption": 0 Wh".

The electric power consumption analysis result table 503*a* is updated by the analysis processing unit 503 at regular intervals, for example, by the month, hour, or day. Further, the electric power consumption analysis result table 503*a* generated for each aggregate calculation period (e.g., by the month, hour, or day) may be included in the analysis processing unit 503.

Figure 12:
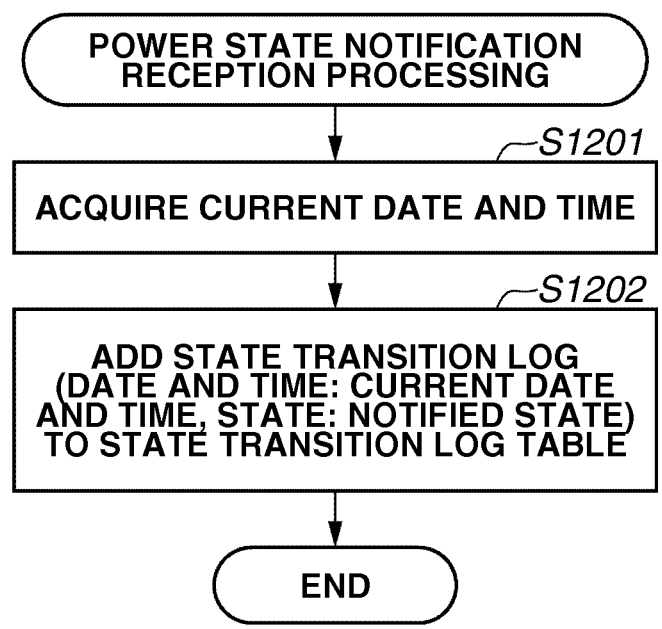
FIG. 12 is a flowchart illustrating an example of power state notification reception processing according to the first exemplary embodiment.

FIG. 12 is a flowchart illustrating an example of the power state notification reception processing performed by the information processing apparatus according to the present embodiment. The example is a case where the analysis server 102 illustrated in FIG. 1 performs the processing as the information processing apparatus. Each of operations S1201 and S1202 is realized by the CPU 201 of the analysis server 102 loading a control program from the HD 211 or the ROM 202 onto the RAM 203 and executing the program.

The power state notification reception processing is started when the power state monitoring unit 505 of the analysis server 102 receives a power state notification from the printer 103 or the multifunction peripheral 104.

In operation S1201, when the power state notification reception processing is started, the power state monitoring unit 505 acquires the current time of the analysis server 102. In operation S1202, the power state monitoring unit 505 generates a state transition log and stores the log in the state transition log table 505*a* (see FIG. 9). In the state transition log, the ID of the image forming apparatus that transmitted the power state notification to the analysis server is set to the column labeled "image forming apparatus ID", the current date and time acquired in operation S1201 is set to the column 902 labeled "date and time", and the state of the power state notification received by the analysis server is set to the column 903 labeled "state". Then, the processing ends.

Figure 13:
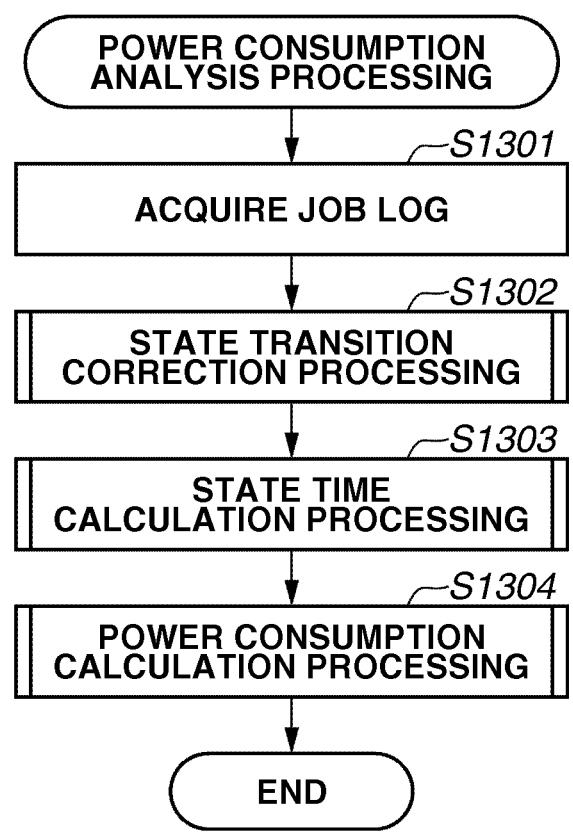
FIG. 13 is a flowchart illustrating an example of power consumption analysis processing according to the first exemplary embodiment.

FIG. 13 is a flowchart illustrating an example of the power consumption analysis processing performed by the information processing apparatus according to the present embodiment. The example illustrates a case where the analysis server 102 illustrated in FIG. 1 performs the processing as the information processing apparatus. Each of operations S1301 to S1304 is realized by the CPU 201 of the analysis server 102 loading a control program from the HD 211 or the ROM 202 onto the RAM 203 and executing the program. The analysis server 102 executes the power consumption analysis processing at a predetermined interval.

In operation S1301, when the power consumption analysis processing is started, the analysis processing unit 503 acquires a job log which has not undergone the processing from the job log table 502*a* stored in the job log collecting unit 502.

In operation S1302, the analysis processing unit 503 performs the state transition correction processing by using the job log acquired in operation S1301. Details of the state transition correction processing in operation S1302 will be described below with reference to FIG. 14.

In operation S1303, the analysis processing unit 503 performs the state time calculation processing by using the state transition log corrected by the state transition correction processing in operation S1302. Details of the state time calculation processing in operation S1303 will be described below with reference to FIG. 15.

In operation S1304, the analysis processing unit 503 performs the power consumption calculation processing by using the state time information acquired by the state time calculation processing in operation S1303 and the job log acquired in operation S1301. Then the processing ends. Details of the power consumption calculation processing in operation S1304 will be described below with reference to FIG. 16.

Figure 14B:
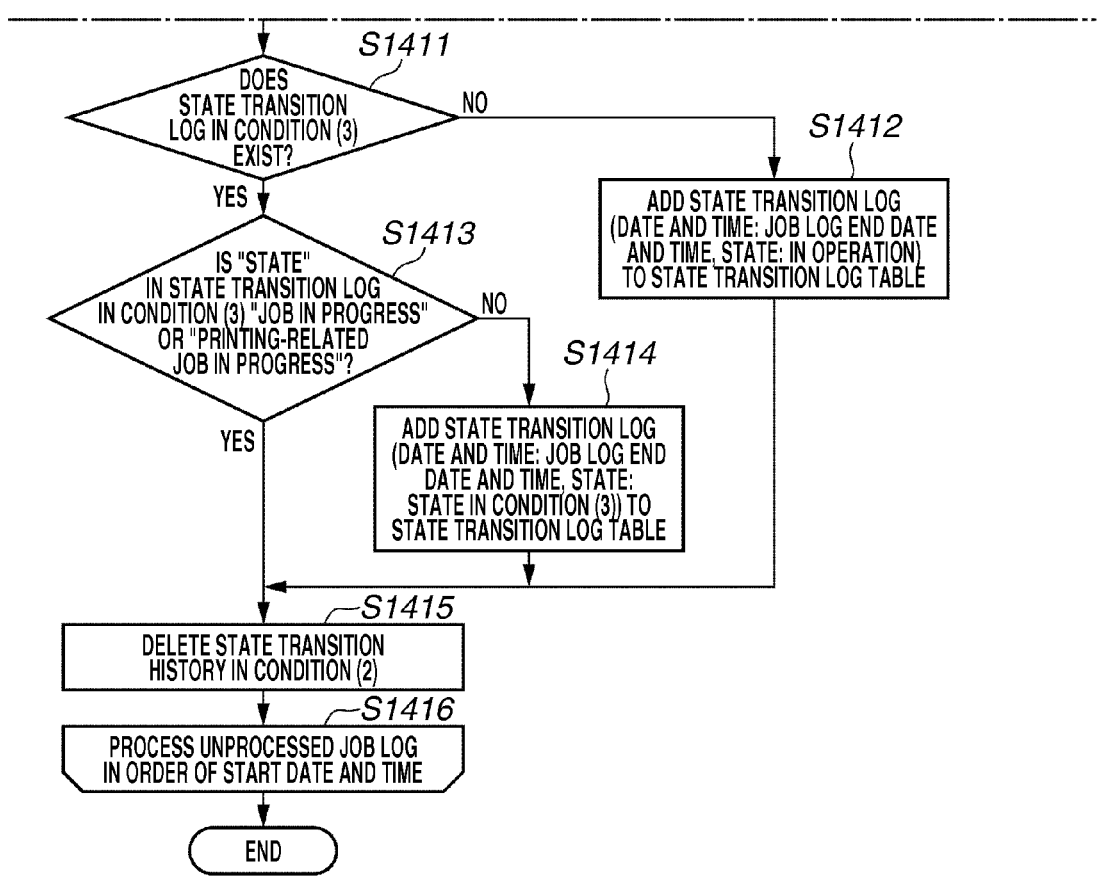
FIG. 14, composed of FIGS. 14A and 14B, is a flowchart illustrating an example of state transition correction processing according to the first exemplary embodiment.

FIG. 14 is a flowchart illustrating an example of the state transition correction processing of the information processing apparatus according to the first exemplary embodiment. The flowchart in FIG. 14 illustrates a case where the analysis server 102 in FIG. 1 performs the state transition correction processing as the information processing apparatus and corresponds to detailed processing of the state transition correction processing executed in operation S1302 in FIG. 13. Each of operations S1401 to S1416 is realized by the CPU 201 of the analysis server 102 loading a control program from the HD 211 or the ROM 202 onto the RAM 203 and executing the program.

According to this state transition correction processing, the state transition log table 505*a* is updated so that the power state is changed to either the "printing-related job in progress" or the "job in progress" at the job start date and time from the job log stored in the job log table 502*a*. Further the state transition log table 505*a* is updated so that the power state is returned to the original state at the job end date and time from the job log stored in the job log table 502*a*. Further, if the power state notification is received normally, the power state will be "in operation" between the job start date and time and the job end date and time.

However, if the power state notification is not received normally, the "state" may be changed to "power off" or "transition to power saving mode". In this case, the table is updated so that the state is returned to the state of the state transition log just before the job end date and time. Further, jobs may be continuously executed. If jobs are continuously executed, the table is updated so that the "printing-related job in progress" or the "job in progress" is continuously processed.

Further, if jobs are continuously executed and if at least one printing-related job is included in a continuously-executed job, the "state" will be changed to the "printing-related job in progress". If jobs A and B are started in the order of job A and job B and the job B is started before job A is finished, then the jobs will be determined as a continuously-executed job.

When the state transition correction processing is started, the analysis processing unit 503 repeats the processing in operations S1401 to S1416 with respect to an unprocessed job log out of the job log acquired from the job log table 502*a* in operation S1301 in FIG. 13. When the analysis processing unit 503 performs the processing, the processing is controlled so that the job log is processed in the order of the start date and time. In operation S1401, from the job log acquired in operation S1301 in FIG. 13, the analysis processing unit 503 acquires a job log of an unprocessed job (hereinafter referred to as a current job log), and the processing proceeds to operation S1402.

In operation S1402, from the state transition log table 505*a*, the analysis processing unit 503 retrieves and acquires a date and time in the column 902 that matches the following conditions (1) to (3) out of the state transition logs whose image forming apparatus ID in the column 901 match the image forming apparatus ID in the column 802 of the current job log.

(1) just before the start date and time in the column 804 of the current job log;
(2) between the start date and time in the column 804 and the end date and time in the column 805 of the current job log; and
(3) just before the end date and time in the column 805 of the current job log.

The state transition log whose date and time in the column 902 is "(1) just before the start date and time in the column 804 of the current job log" indicates the first-retrieved state transition log in reverse chronological order from the start date and time in the column 804 of the current job log. In other words, it is the state transition log where the date and time in the column 902 is before and closest to the start date and time in the column 804 of the current job log. The state transition log whose date and time in the column 902 is "(3) just before the end date and time in the column 805 of the current job log" indicates the first-retrieved state transition log in reverse chronological order from the end date and time in the column 805 of the current job log. In other words, it is the state transition log where the date and time in the column 902 is before and closest to the end date and time in the column 805 of the current job log.

Thus, if a state transition log that matches "(2) between the start date and time in the column 804 and the end date and time in the column 805 of the current job log" does not exist, the state transition log that matches the condition (1) will be the same as the state transition log that matches the condition (3). Further, if the state transition log does not exist, the state transition log that matches the conditions (1), (2), and (3) does not exist.

In operation S1403, the analysis processing unit 503 determines whether the state transition log in the condition (1) acquired in operation S1402 exists. If the analysis processing unit 503 determines that the state transition log in the condition (1) exists (YES in operation S1403), the processing proceeds to operation S1404. On the other hand, if the analysis processing unit 503 determines that the state transition log in the condition (1) does not exist (NO in operation S1403), the processing proceeds to operation S1408.

In operation S1404, the analysis processing unit 503 determines whether the state in the column 903 of the state transition log in the condition (1) acquired in operation S1402 is the "printing-related job in progress". If the analysis processing unit 503 determines that the state in the column 903 of the state transition log in the condition (1) is the "printing-related job in progress" (YES in operation S1404), the processing proceeds to operation S1411. If the analysis processing unit 503 determines that the state in the column 903 of the state transition log in the condition (1) is not the "printing-related job in progress" (NO in operation S1404), the processing proceeds to operation S1405.

In operation S1405, the analysis processing unit 503 determines whether the state in the column 903 of the state transition log in the condition (1) acquired in operation S1402 is the "job in progress". If the analysis processing unit 503 determines that the state in the column 903 of the state transition log in the condition (1) is the "job in progress" (YES in operation S1405), the processing proceeds to operation S1406. If the analysis processing unit 503 determines that the state in the column 903 of the state transition log in the condition (1) is not the "job in progress" (NO in operation S1405), the processing proceeds to operation S1408.

In operation S1406, the analysis processing unit 503 determines whether the job type in the column 803 of the current job log is a printing-related job. If the analysis processing unit 503 determines that the job type in the column 803 of the current job log is a printing-related job (YES in operation S1406), the processing proceeds to operation S1407. If the analysis processing unit 503 determines that the job type in the column 803 of the current job log is not a printing-related job (NO in operation S1406), the processing proceeds to operation S1411. In other words, if a job is started without an interval after a printing-related job is executed, a state transition log will not be added and the job will be included in the state transition log being the "printing-related job in progress" of the job that has been executed before the job.

In operation S1407, the analysis processing unit 503 changes the state in the column 903 of the state transition log in the condition (1) to the "printing-related job in progress", and the processing proceeds to operation S1411. In other words, if a job other than a printing-related job and a printing-related job are continuously executed, the state transition log of the "job in progress" will be changed to the "printing-related job in progress" so that one state transition log of the "printing-related job in progress" is set without adding the state transition log of the "printing-related job in progress".

In operation S1408, the analysis processing unit 503 determines whether the job type in the column 803 of the current job log is a printing-related job. If the analysis processing unit 503 determines that the job type in the column 803 of the current job log is a printing-related job (YES in operation S1408), the processing proceeds to operation S1409. If the analysis processing unit 503 determines that the job type in the column 803 of the current job log is not a printing-related job (NO in operation S1408), the processing proceeds to operation S1410.

In operation S1409, the analysis processing unit 503 generates the state transition log in which the date and time in the column 902 is set to the start date and time in the column 804 of the job log and the state in the column 903 is set to the "printing-related job in progress", and stores the generated state transition log in the state transition log table 505a. Then, the processing proceeds to operation S1411. In other words, based on the start date and time of the printing-related job, a state transition log of the "printing-related job in progress" is newly added to the state transition log table.

According to the processing in operations S1407 and S1409, whether a printing-related job is included in continuously-executed jobs may be determined. In other words, whether the drum has been rotated or the fixing unit has been heated during the job processing may be determined.

In operation S1410, the analysis processing unit 503 generates the state transition log in which the date and time in the column 902 is set to the start date and time in the column 804 of the job log and the state in the column 903 is set to the "job in progress", and stores the generated state transition log in the state transition log table 505a. Then, the processing proceeds to operation S1411. In other words, based on the start date and time of the printing-related job, a state transition log of the "job in progress" is newly added to the state transition log table.

In operation S1411, the analysis processing unit 503 determines whether the state transition log in the condition (3) acquired in operation S1402 exists. If the analysis processing unit 503 determines that the state transition log in the condition (3) acquired in operation S1402 exists (YES in operation S1411), the processing proceeds to operation S1413. If the analysis processing unit 503 determines that the state transition log in the condition (3) acquired in operation S1402 does not exist (NO in operation S1411), the processing proceeds to operation S1412.

In operation S1412, the analysis processing unit 503 generates the state transition log in which the date and time in the column 902 is set to the end date and time in the column 805 of the current job log and the state in the column 903 is set to the "in operation", and stores the generated state transition log in the state transition log table 505a. Then, the processing proceeds to operation S1415. In other words, a state transition log that changes the state to "in operation" at the job end date and time is added to the state transition log table.

In operation S1413, the analysis processing unit 503 determines whether the state in the column 903 of the state transition log in the condition (3) acquired in operation S1402 is the "job in progress" or the "printing-related job in progress". If the analysis processing unit 503 determines that the state in the column 903 of the state transition log in the condition (3) is the "job in progress" or the "printing-related job in progress" (YES in operation S1413), the processing proceeds to operation S1415. If the analysis processing unit 503 determines that the state in the column 903 of the state transition log in the condition (3) is not the "job in progress" or the "printing-related job in progress" (NO in operation S1413), the processing proceeds to operation S1414.

In operation S1414, the analysis processing unit 503 generates the state transition log in which the date and time in the column 902 is set to the end date and time in the column 805 of the job log and the state in the column 903 is set to the "state of the state transition log in the condition (3)", and stores the generated state transition log in the state transition log table 505a. Then, the processing proceeds to operation S1415. In other words, if the power state notification is not received normally, the "state" may be set to the "power off" or the "transition to power saving". In this case, the state transition log is added so that the state is returned to the "state" of the state transition log just before the job end date and time at the job end date and time.

In operation S1415, the analysis processing unit 503 deletes the state transition log in the condition (2) acquired in operation S1402 from the state transition log table 505a. In other words, the state transition log based on other jobs which have been continuously executed is deleted. Then, the processing proceeds to operation S1416.

In operation S1416, the analysis processing unit 503 determines whether there is a job log that has not undergone the processing in operations S1401 to S1416. If the analysis processing unit 503 determines that there is a job log that has not undergone the processing in operations S1401 to S1416, the processing returns to operation S1401. If the analysis processing unit 503 determines that there all the job logs have undergone the processing in operations S1401 to S1416, the processing ends.

According to the above-described processing, the state "printing-related job in progress" or the "job in progress" may be added to the state transition log table 505a in FIG. 9. At that time, if execution of continuously-executed jobs that include a printing-related job is started and a different printing-related job is started before the continuously-executed jobs are finished, then these jobs as a whole will be recorded in the state transition log as one printing-related job ("printing-related job in progress"). In this manner, as described below with reference to the flowchart in FIG. 15, the number of times of the processing which is executed when the printing is started with respect to the continuously-executed jobs including the printing-related jobs is identified as one.

FIG. 15 is a flowchart illustrating an example of the state time calculation processing of the information processing apparatus according to the first exemplary embodiment. The example illustrates a case where the analysis server 102 illustrated in FIG. 1 performs the processing as the information processing apparatus and corresponds to the example of the detailed procedures of the state time calculation processing illustrated in operation S1303 in FIG. 13. Each of operations S1501 to S1507 is realized by the CPU 201 of the analysis server 102 loading a control program from the HD 211 or the ROM 202 onto the RAM 203 and executing the program.

According to the state time calculation processing, the "job processing time", the "normal mode time", the "power saving mode time", and the "power off time" of the image forming apparatus are calculated according to the state transition log stored in the state transition log table 505a (FIG. 9). Further, the state transition log number of the printing-related job in progress is also counted.

In operation S1501, when the state time calculation processing is started, the analysis processing unit 503 acquires a state transition log which has not undergone the state time calculation processing from the state transition log table 505a (FIG. 9) managed by the power state monitoring unit 505.

Next, the analysis processing unit 503 repeats the processing in operations S1502 to S1507 with respect to an unprocessed state transition log. When the analysis processing unit 503 performs the processing, the processing is controlled so that the state transition log is processed in the order of the start date and time. In operation S1502, from the state transition log acquired in operation S1501, the analysis processing unit 503 acquires one unprocessed state transition log (hereinafter referred to as a current state transition log), and the processing proceeds to operation S1503.

In operation S1503, the analysis processing unit 503 calculates the state time being the "job processing time", the "normal mode time", the "transition to power saving", and the "power off" according to the current state transition log. The "job processing time" is time from when the state in the column 903 of the current state transition log is the "job in progress" or the "printing-related job in progress" to when the state is changed to a different state. The "normal mode time" is time from when the state is the "cancel power saving", the "power on", or the "in operation" to when the state is changed to a different state. The "power saving mode time" is time from when the state is the "transition to power saving" to when the state is changed to a different state. Further, the "power off time" is time from when the state is "power off" to when the state is changed to a different state.

In operation S1504, the analysis processing unit 503 performs total time calculation processing. In other words, the analysis processing unit 503 adds the state time calculated in operation S1503 to the time in the columns 1003 to 1006 and in the row where the date of aggregate calculation in the column 1001 and the image forming apparatus ID in the column 1002 in the state time table 503b (see FIG. 10) match the date and time in the column 902 and the image forming apparatus ID in the column 901 of the current state transition log. If a corresponding row does not exist, a row will be generated.

In operation S1505, the analysis processing unit 503 determines whether the state in the column 903 of the current state transition log is the "printing-related job in progress". If the analysis processing unit 503 determines that the state in the column 903 of the current state transition log is the "printing-related job in progress" (YES in operation S1505), the processing proceeds to operation S1506. If the analysis processing unit 503 determines that the state in the column 903 of the current state transition log is not the "printing-related job in progress" (NO in operation S1505), the processing proceeds to operation S1507.

In operation S1506, the analysis processing unit 503 increments the printing-related job start number in the column 1007 of the row where the state time information in which the date of aggregate calculation in the column 1001 and the image forming apparatus ID in the column 1002 of the state time table 503*b* match the date and time in the column 902 and the image forming apparatus ID in the column 901 of the current state transition log by "1". According to this processing (identification processing) in operation S1506, the number of job processing operations including a printing-related job may be determined. In other words, the number of times a job including the rotation of the drum or the heating of the fixing unit has been performed may be acquired when a job is started.

In operation S1507, the analysis processing unit 503 determines whether there is a state transition log that has not undergone the processing in operations S1502 to S1507. If the analysis processing unit 503 determines that there is a state transition log that has not undergone the processing in operations S1502 to S1507, the processing returns to operation S1502. If the analysis processing unit 503 determines that all the state transition logs have undergone the processing in operations S1502 to S1507, the processing ends.

According to the present exemplary embodiment, although the time of each image forming apparatus in each state is calculated by the date in the column 1001, each state time may be also designated and calculated by the hour or by the month. According to the processing described above, a total time of each image forming apparatus in each state in the designated time unit (period) may be calculated. Further, the number of times each image forming apparatus has executed processing which is performed when printing is started in the designated time unit (period) may be identified.

Figure 16:
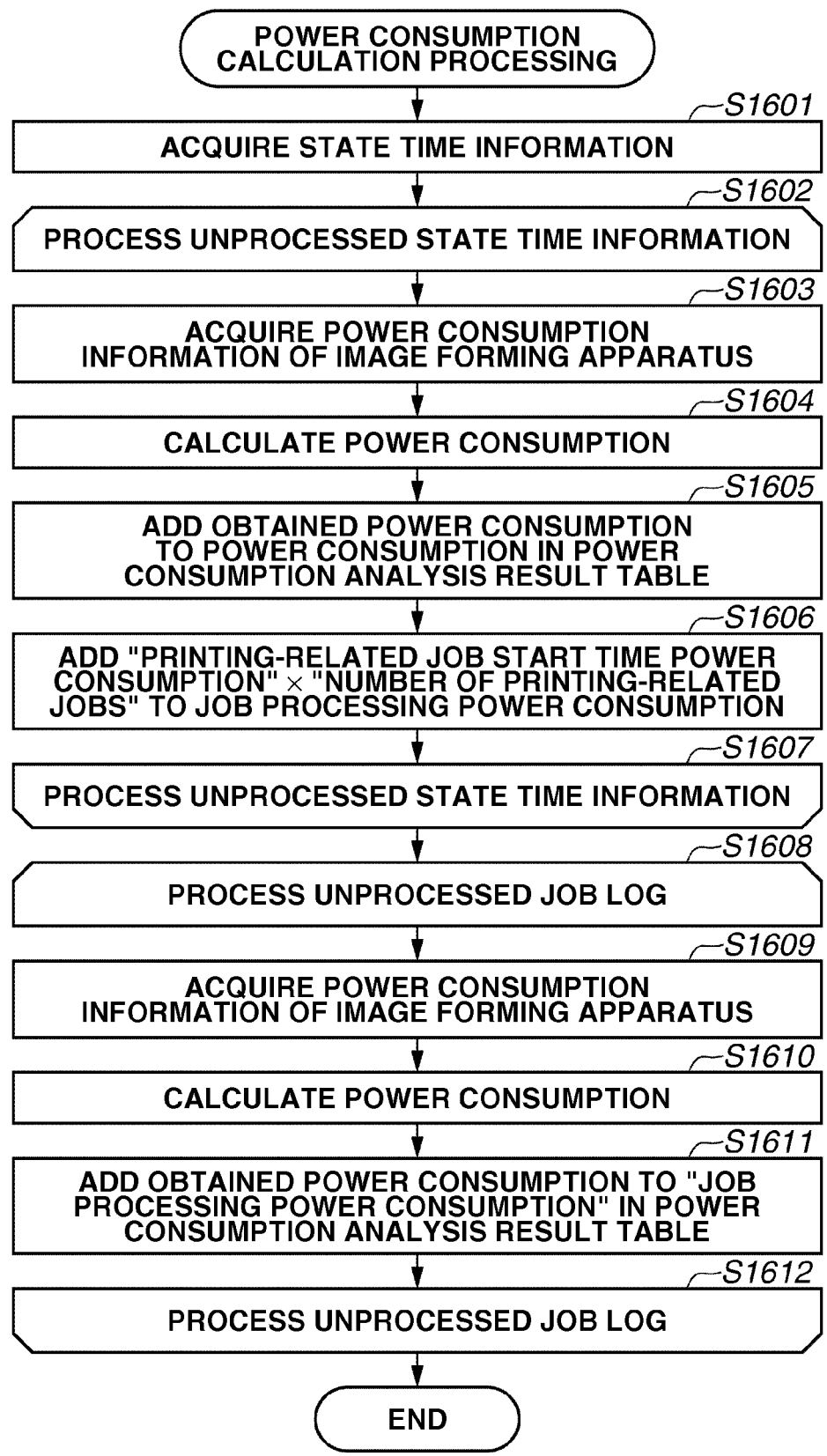
FIG. 16 is a flowchart illustrating an example of power consumption calculation processing according to the first exemplary embodiment.

FIG. 16 is a flowchart illustrating an example of the power consumption calculation processing of the information processing apparatus according to the present embodiment. The example illustrates a case where the analysis server 102 illustrated in FIG. 1 performs the processing as the information processing apparatus and corresponds to the procedure of the power consumption calculation processing executed in operation S1304 in FIG. 13. According to the present power consumption calculation processing, the "job in progress power consumption", the "normal mode power consumption", the "power saving mode power consumption", and the "power off power consumption" of the image forming apparatus are calculated according to the state time information. Further, the power consumption is corrected by adding "printing-related job start time power consumption" to the "job in progress power consumption" for the number of times the printing-related job has been started.

Each of operations S1601 to S1612 is realized by the CPU 201 of the analysis server 102 loading a control program from the HD 211 or the ROM 202 onto the RAM 203 and executing the program.

In operation S1601, when the power consumption calculation processing is started, the analysis processing unit 503 acquires state time information of the job which has not undergone the power consumption calculation processing from the state time table 503*b* (FIG. 10) managed by the analysis processing unit 503.

Next, the analysis processing unit 503 repeats the processing in operations S1602 to S1607 with respect to state time information. In operation S1602, from the state time information acquired in operation S1601, the analysis processing unit 503 acquires unprocessed state time information (hereinafter referred to as current state time information), and the processing proceeds to operation S1603.

In operation S1603, the analysis processing unit 503 acquires from the image forming apparatus power consumption table 504*a* (see FIG. 7) the power consumption in the columns 703 to 707 in the power consumption information of an image forming apparatus whose ID in the column 701 matches the image forming apparatus ID in the column 1002, which is the ID of the image forming apparatus of the current state time information. In other words, the analysis processing unit 503 acquires the power consumption in different states in the columns 703 to 706 and the printing-related job start time power consumption in the column 707.

In operation S1604, the analysis processing unit 503 calculates the "job in progress power consumption", the "normal mode power consumption", the "power saving mode power consumption", and the "power off power consumption" in Wh by multiplying each time in the columns 1003 to 1006 of the current state time information converted into units of hours (h) by the power consumption in the columns 703 to 706 in (W) acquired in operation S1603.

In operation S1605, the analysis processing unit 503 adds the power consumption calculated in operation S1604 to the power consumption in the columns 1103 to 1106 and in the row where the date of aggregate calculation in the column 1001 and the image forming apparatus ID in the column 1002 in the current state time information match the month of aggregate calculation in the column 1101 and the image forming apparatus ID in the column 1102 in the electric power consumption analysis result table 503*a* (see FIG. 11). If a corresponding row does not exist, a row will be generated.

In operation S1606, the analysis processing unit 503 multiplies the printing-related job start time power consumption (Wh) acquired in operation S1603 in the column 707 by the printing-related job start number in the state time information in the column 1007. Then, the analysis processing unit 503 adds the obtained value to the job processing power consumption in the column 1103 and in the row where the date of aggregate calculation in the column 1001 and the image forming apparatus ID in the column 1002 in the current state time information match the month of aggregate calculation in the column 1101 and the image forming apparatus ID in the column 1102 in the electric power consumption analysis result table 503*a* (see FIG. 11). According to the processing in operation S1606, the "printing-related job start time power consumption" is added to the power consumption corresponding to the number of times the rotation of the drum or the heating of the fixing unit has been performed. In this manner, the power consumption when a job is started is added and the accuracy of the power consumption is improved.

In operation S1607, the analysis processing unit 503 determines whether there is state time information that has not undergone the processing in operations S1602 to S1607. If the analysis processing unit 503 determines that there is state time information that has not undergone the processing in operations S1602 to S1607, the processing returns to operation S1602. If the analysis processing unit 503 determines that all the state time information has undergone the processing in operations S1602 to S1607, the processing proceeds to operation S1608.

Next, the analysis processing unit 503 repeats the processing in operations S1608 to S1612 with respect to an unprocessed job log. The analysis processing unit 503 acquires one unprocessed job log from the job log table 502*a* (see FIG. 8) (hereinafter, referred to as current job log), and the processing proceeds to operation S1609.

In operation S1609, from the image forming apparatus power consumption table 504*a* (see FIG. 7), the analysis processing unit 503 acquires the power consumption in the columns 708 to 712 for each page in the image forming apparatus power consumption information of an image forming apparatus whose image forming apparatus ID in the column 701 matches the image forming apparatus ID in the column 801 of the current job log. For example, if the job type in the column 803 of the current job log is "print", the analysis processing unit 503 acquires the monochrome printing power consumption in the column 708 and the color printing power consumption in the column 709, sets them as a monochrome page power consumption variable and a color page power consumption variable, and sets the scan page power consumption variable to "0".

Further, if the job type in the column 803 of the current job log is "copy", the monochrome copy power consumption in the column 710, the color copy power consumption in the column 711, and the scanning power consumption in the column 712 are acquired and set as monochrome page power consumption variable, color page power consumption variable, and scanning page power consumption variable. Further, if the job type in the column 803 of the current job log is "scan", the scanning power consumption in the column 712 is acquired and set as the scanning page power consumption variable, and the monochrome page power consumption variable and the color page power consumption variable are set to "0".

In operation S1610, the analysis processing unit 503 multiplies the number of processed pages according to each job of the current job log (columns 806 to 808) by the power consumption per page corresponding to the job acquired in operation S1609 and obtains the "job in progress power consumption". The power consumption per page corresponding to the job acquired in operation S1609 is, for example, the above-described monochrome page power consumption variable, the color page power consumption variable, or the scanning page power consumption variable.

In operation S1611, the analysis processing unit 503 adds the job processing power consumption calculated in operation S1609 to the job processing power consumption in the column 1103 in the row where the end date and time in the column 805 (or the start date and time in the column 804) and the image forming apparatus ID in the column 802 in the current state time information match the month of aggregate calculation in the column 1101 and the image forming apparatus ID in the column 1102 in the electric power consumption analysis result table 503a (see FIG. 11). If a corresponding row does not exist, a row will be generated.

In operation S1612, the analysis processing unit 503 determines whether there is a job log which has not undergone the processing in operations S1608 to S1612. If the analysis processing unit 503 determines that there is a job log which has not undergone the processing in operations S1608 to S1612, the processing returns to operation S1608. If the analysis processing unit 503 determines that all the job logs have undergone the processing in operations S1608 to S1612, the processing ends.

According to the present embodiment, although the power consumption in each state of the image forming apparatus is calculated in the unit in the column 1101 (i.e., by the month) in FIG. 11, the month of aggregate calculation in the unit in the column 1101 may be changed to the calculation by the hour or by the day by designation. According to the above-described processing, the power consumption of each image forming apparatus in each state in the designated period may be calculated more accurately.

Figure 17:
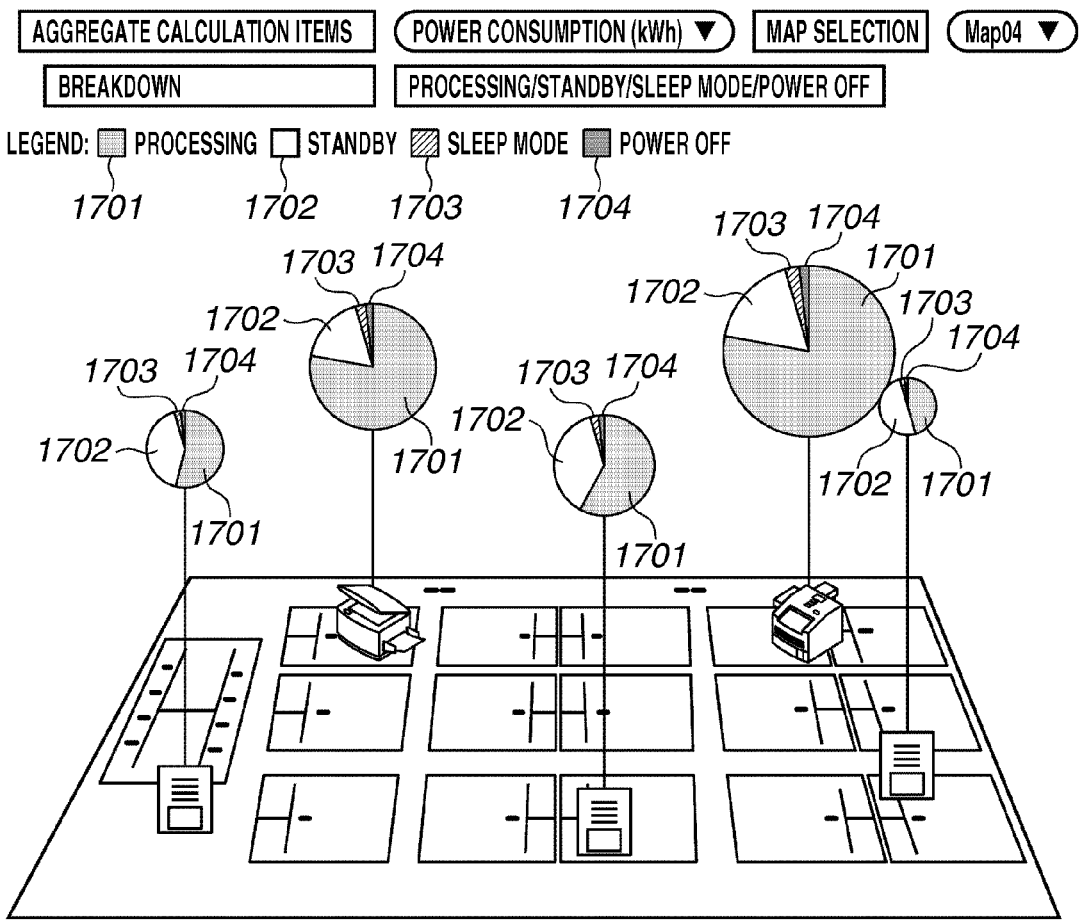
FIG. 17 illustrates an example of a display screen used for displaying a power consumption analysis result graph for each image forming apparatus according to the first exemplary embodiment.
Figure 18:
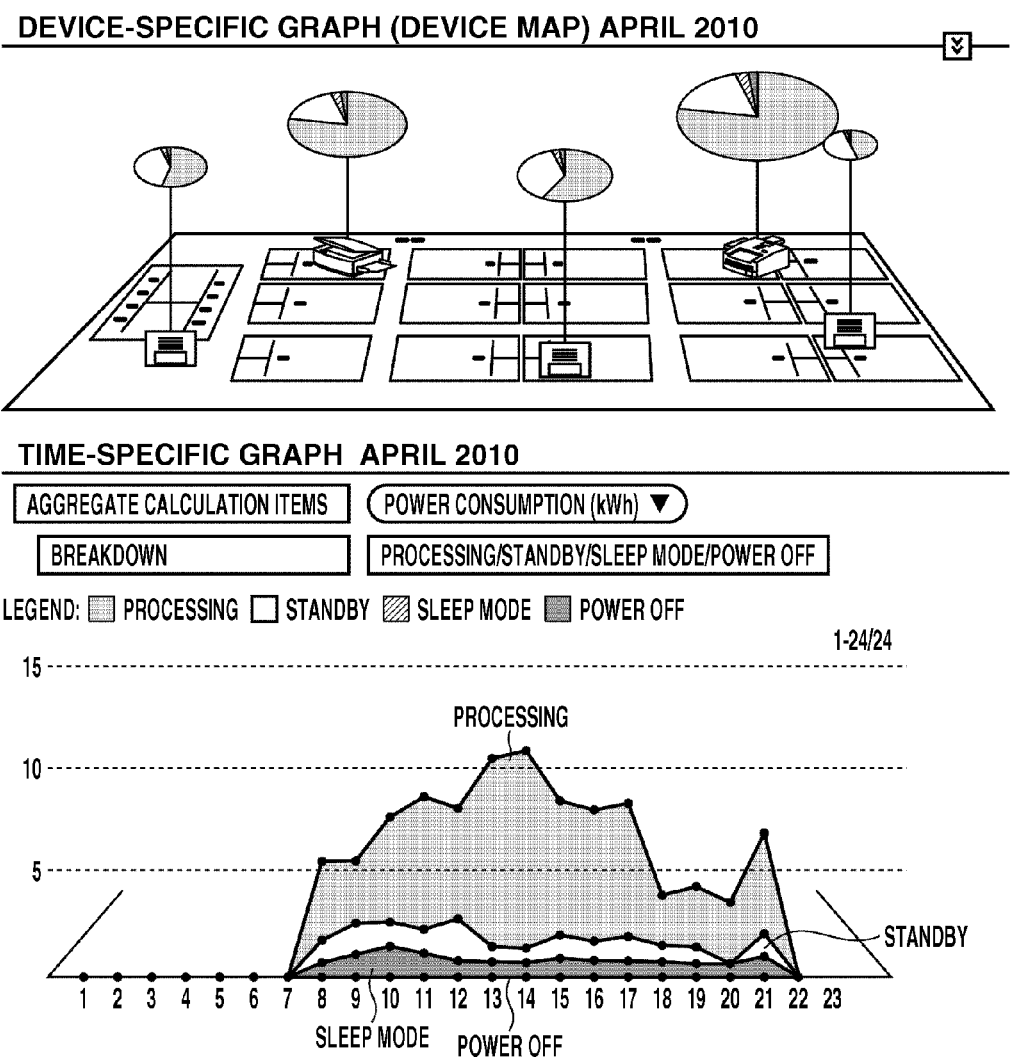
FIG. 18 illustrates an example of a display screen used for displaying a time period specific power consumption analysis result graph for each image forming apparatus according to the first exemplary embodiment.

A display screen such as the one illustrated in FIG. 17 or 18 is generated by the analysis processing unit 503 based on the electric power consumption analysis result table 503a (see FIG. 11). The generated display screen is transmitted to the web browser 404 of the host computer 101 via the interface unit 501 according to HTTP or HTTPS protocol. Then the display screen is displayed by the web browser 404. Further, the analysis server 102 may be configured such that the analysis processing unit 503 displays the display screen such as the one illustrated in FIG. 17 or 18 on the display module (DISPLAY) 210.

FIG. 17 illustrates an example of a display screen used for displaying a power consumption analysis result graph for each image forming apparatus according to the present embodiment.

The power consumption analysis result graph for each image forming apparatus illustrates the power consumption of each image forming apparatus in the electric power consumption analysis result table 503a in FIG. 11.

According to this power consumption analysis result graph for each image forming apparatus, an icon that represents the installation position of the image forming apparatus is arranged on a map. The power consumption is presented by a chart (e.g., a pie chart, a circle graph) for each icon representing the image forming apparatus. The above-described map and information of the arrangement position of each image forming apparatus are registered in advance in the HD of the analysis server 102.

Each chart illustrates the power consumption of each image forming apparatus. The size of the chart indicates whether the power consumption is large or small. In other words, the chart is presented according to the amount of power consumption. Further, the ratio of the power consumption with respect to each of the states (in progress, standby (normal mode), sleep mode (power saving mode), and power off) is displayed as a breakdown of the chart. Accordingly, the user may visually understand the power consumption of the image forming apparatus in each state.

FIG. 18 illustrates an example of a display screen used for displaying a time period specific power consumption analysis result graph of the image forming apparatus according to the present embodiment. The time period specific power consumption analysis result graph of the image forming apparatus is a time period specific graph of the power consumption based on the electric power consumption analysis result table.

When the analysis processing unit 503 executes the processing in operations S1502 to S1507 in FIG. 15, with respect to the data in the columns 1003 to 1007 in the state time table in FIG. 10, data for each time period is generated and stored in a state time table (not shown) for each time period. Further, when the analysis processing unit 503 executes the processing in operations S1602 to S1607 and S1608 to S1612 in FIG. 16, by using the above-described state time table for each time period, the analysis processing unit 503 generates time period specific data for data in the columns 1103 to 1106 in the electric power consumption analysis result table in FIG. 11, and stores the generated time period specific data in a time period specific power consumption analysis result table (not shown). Based on the time period specific data generated according to such processing, display screen in FIG. 18 is displayed.

The display of the graph of the time period specific power consumption analysis result graph of the image forming apparatus may be changed by selecting the icon or the chart that represents the image forming apparatus on the power consumption analysis result graph for each image forming apparatus in FIG. 17. When the graph is changed, power consumption analysis result graph for each image forming apparatus (display information in FIG. 17) is displayed as well so that the image forming apparatus which has been selected with respect to the power consumption analysis result graph for each image forming apparatus is understood. At that time, as illustrated in FIG. 18, the size of the power consumption analysis result graph for each image forming apparatus is reduced so that there is enough display space.

The time period specific power consumption analysis result graph of the image forming apparatus may be presented by the date or by the month. Further, an average value of each time period of a certain month or an average of each day of the week in a month may be presented.

When the analysis processing unit 503 of the analysis server 102 receives a display instruction regarding the power consumption analysis result graph from the web browser 404 of the host computer, the analysis processing unit 503 reads the power consumption analysis result of each image forming apparatus in the period designated by the above-described display instruction from the electric power consumption analysis result table 503a (see FIG. 11), and calculates a total of the power consumption regarding the time in the columns 1003 to 1006 of each image forming apparatus.

Further, the analysis processing unit 503 arranges icons that represent the positions of the image forming apparatuses on the map, generates a display screen (see FIG. 17) used for displaying a chart, which has a size corresponding to the amount of the power consumption of the image forming apparatus, for each icon representing the image forming apparatus, and transmits the generated display screen to the web browser 404. The analysis processing unit 503 performs control so that the ratio of the power consumption of the image forming apparatus in each state (in progress, standby (normal mode), sleep mode (power saving mode), or power off), is included in the chart when the chart is displayed on the display screen.

Further, when an image forming apparatus is selected out of the power consumption analysis result graph for each image forming apparatus in FIG. 17, the analysis processing unit 503 performs detailed display screen generation processing of the selected image forming apparatus. In other words, the analysis processing unit 503 acquires a time period specific power consumption analysis result from the time period specific power consumption analysis result table (not shown) and generates a detailed display screen (see FIG. 18) that displays a time period specific power consumption analysis result graph. Then, the analysis processing unit 503 transmits the detailed display screen to the web browser 404.

The analysis processing unit 503 may also display the power consumption analysis result graph in FIGS. 17 and 18 on the display module (DISPLAY) 312 of the analysis server 102.

A second exemplary embodiment of the present invention is based on the first exemplary embodiment but enables counting of the number of times the drum has been rotated or the fixing unit has been heated more accurately. For example, if jobs are continuously executed in the order of "print job, scan job, copy job, and copy job", the rotation of the drum and the heating of the fixing unit which are performed when a printing-related job is started will be performed twice (once for the print job and one more time for the first copy job).

According to the first exemplary embodiment, whether a printing-related job is included or not in a continuously-executed job is determined. Thus, in the case of the above-described example, the job start time power consumption is added only once. According to the second exemplary embodiment, in the case of the above-described example, the job start time power consumption is added twice. Accordingly, the accuracy of the power consumption is improved. In other words, if a printing-related job is started while a different printing-related job is still being processed, then the number of times the printing-related processing has been executed when the printing has been started will be counted as once for the whole job.

Further, a great amount of power is consumed when the power of the image forming apparatus is turned on since the start processing requires a considerable amount of power. Similarly, when the power of the image forming apparatus is turned off, the shutdown processing also requires a considerable amount of power. According to the second exemplary embodiment, when the state of the image forming apparatus is changed to the power-on or the power-off state, the power that is used when the state is changed is added to the power consumption. Thus, the accuracy of the power consumption may be improved.

Further, if the image forming apparatus includes a finisher that performs processing such as stapling or punching, power will be always consumed by the finisher. Furthermore, if the finisher is used when a job is executed, power necessary for the processing will be consumed. According to the second exemplary embodiment, if an image forming apparatus includes a finisher or if the finisher is used when a job is executed, the power used at that time will be added to the power consumption. Accordingly, the accuracy of the power consumption may be furthermore improved.

In the description below, only the portions different from the first exemplary embodiment are described and descriptions of the portions similar to the first exemplary embodiment are not repeated.

Figure 19:
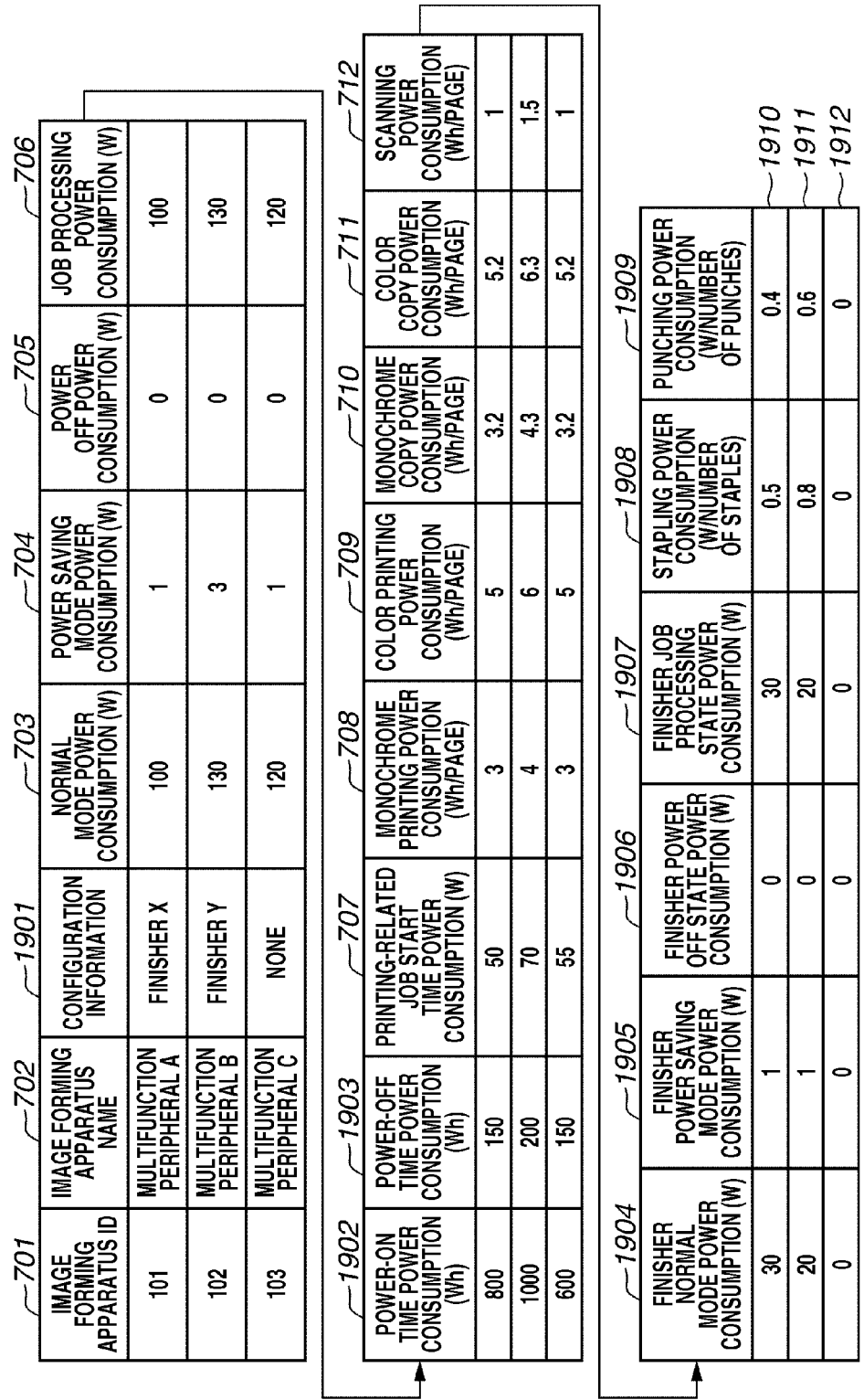
FIG. 19 illustrates an example of the image forming apparatus power consumption table according to a second exemplary embodiment of the present invention.

FIG. 19 illustrates an example of the image forming apparatus power consumption table 504a according to the second exemplary embodiment. In FIG. 19, components similar to those in FIG. 7 are denoted by the same reference numerals.

As illustrated in FIG. 19, the image forming apparatus power consumption table 504a according to the second exemplary embodiment is based on the image forming apparatus power consumption table 504a according to the first exemplary embodiment in FIG. 7 but further includes a column 1901 labeled "configuration information", a column 1902 labeled "power-on time power consumption", a column 1903 labeled "power-off time power consumption", a column 1904 labeled "finisher normal mode power consumption", a column 1905 labeled "finisher saving mode power consumption", a column 1906 labeled "finisher power off state power consumption", a column 1907 labeled "finisher job processing state power consumption", a column 1908 labeled "stapling power consumption", and a column 1909 labeled "punching power consumption" 1909.

The column 1901 labeled "configuration information" indicates information of the units included in the image forming apparatus. The configuration information includes information related to finishing that uses stapling and punching. The column 1902 labeled "power-on time power consumption" indicates the power (Wh) which is used at start processing when power of the image forming apparatus is turned on. The column 1903 labeled "power-off time power consumption" indicates power (Wh) which is used at shutdown processing when power of the image forming apparatus is turned off.

The column 1904 labeled "finisher normal mode power consumption", the column 1905 labeled "finisher saving mode power consumption (W)", and the column 1906 labeled "finisher power off state power consumption" indicate power consumption (W) per unit time for each mode.

The column 1907 labeled "finisher job processing state power consumption" indicates power consumption (W) per unit time. The finisher job processing state power consumption in the column 1907 is independent of the job attribute and is power which is used when the job is being processed. This power is used even when the job processing is stopped due to an error or the like.

The column 1908 labeled "stapling power consumption" indicates the power consumption when the stapling is performed once (Wh/number of staples). The column 1909 labeled "punching power consumption" indicates the power consumption when the punching is performed once (Wh/number of punches). In other words, the columns 1908 and 1909 indicate power consumption of the finisher function. According to the present embodiment, the finisher function includes the stapling function and the punching function. Thus, the table includes the columns 1908 and 1909 illustrating the stapling power consumption and the punching power consumption. However, the finisher function is not limited to such functions and, for example, a paper cutting function or a bookbinding function may also be used. In other words, any function is used so long as the power consumption per page (Wh/page) for each finisher function is included in the image forming apparatus power consumption table 504a.

FIG. 20 illustrates an example of the job log table 502a according to the second exemplary embodiment. In FIG. 20, components similar to those in FIG. 8 are denoted by the same reference numerals.

As illustrated in FIG. 20, the job log table 502a according to the second exemplary embodiment is based on the job log table 502a according to the first exemplary embodiment illustrated in FIG. 8 but further includes columns 2001 and 2002 labeled "number of stapling" and "number of punching".

The column 2001 indicates the number the stapling has been performed according to the corresponding job. The column 2002 indicates the number the punching has been performed according to the corresponding job. As is the case with the image forming apparatus power consumption table 504a in FIG. 19, the job log table 502a of the present embodiment is based on the job log table 502a but further includes the number of processed pages according to each finisher function.

FIG. 21 illustrates an example of the state transition log table 505a according to the second exemplary embodiment. In FIG. 21, components similar to those in FIG. 9 are denoted by the same reference numerals.

As illustrated in FIG. 21, the state transition log table 505a according to the second exemplary embodiment is based on the state transition log table 505a according to the first exemplary embodiment in FIG. 9 but further includes a printing-related job start number 2101.

A column 2101 labeled "printing-related job start number" indicates the number of times a printing-related job has been started in the corresponding job processing when the column 903 labeled "state" is "job in progress" or "printing-related job in progress". In other words, it is the number of times the rotation of the drum or the heating of the fixing unit has been performed when the job has been started.

FIG. 22 illustrates an example of the state time table 503b according to the second exemplary embodiment. In FIG. 22, components similar to those in FIG. 10 are denoted by the same reference numerals.

As illustrated in FIG. 22, the state time table 503b according to the second exemplary embodiment is based on the state time table 503b according to the first exemplary embodiment illustrated in FIG. 10 but further includes columns 2201 and 2202 labeled "number of power-on operations" and "number of power-off operations".

The number of power-on operations in the column 2201 indicates the number of times the state of the image forming apparatus of the corresponding row on the date of aggregate calculation has been changed to the power on state. The number of power-off operations in the column 2202 indicates the number of times the state of the image forming apparatus of the corresponding row on the date of aggregate calculation has been changed to the power off state. In other words, the above-described columns 2201 and 2202 indicate the number of times power-on and power-off of the image forming apparatus of the corresponding row has been performed on the date of aggregate calculation in the column 1001.

Figure 23B:
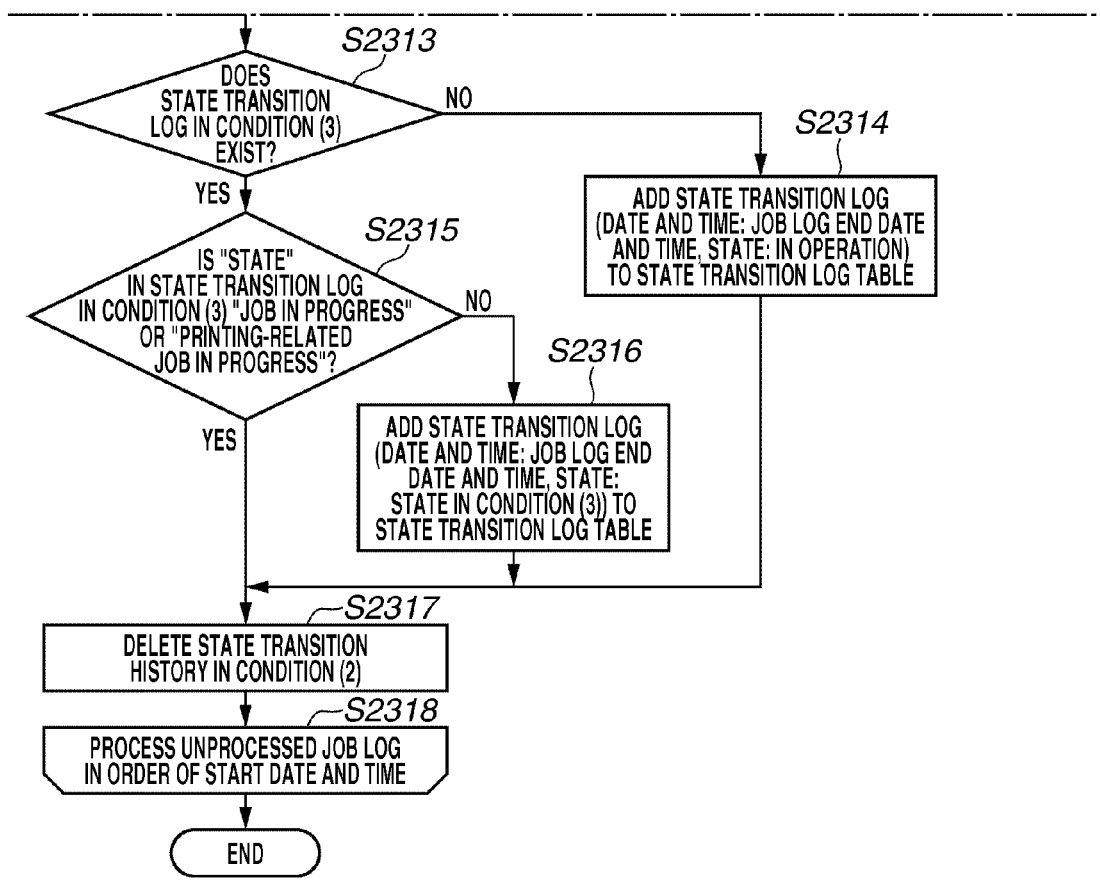
FIG. 23, composed of FIGS. 23A and 23B, is a flowchart illustrating an example of the state transition correction processing according to the second exemplary embodiment.

FIG. 23 is a flowchart illustrating an example of the state transition correction processing according to the second exemplary embodiment. The flowchart is based on the state transition correction processing according to the first exemplary embodiment illustrated in FIG. 14. According to the state transition correction processing of the present embodiment, if jobs are continuously executed in the order of, for example, the print job, the scan job, the copy job, and the copy job, the "printing-related job start number" is changed to "2".

Each of operations S2301 to S2318 is realized by the CPU 201 of the analysis server 102 loading a control program from the HD 211 or the ROM 202 onto the RAM 203 and executing the program.

When the state transition correction processing is started, the analysis processing unit 503 repeats the processing in operations S2301 to S2318 with respect to an unprocessed job log out of the job log acquired from the job log table 502a in FIG. 20. When the analysis processing unit 503 performs the processing, the processing is controlled so that the job log is processed in the order of the start date and time. In operation S2301, the analysis processing unit 503 acquires one unprocessed job (hereinafter referred to as the current job log), and the processing proceeds to operation S2302.

In operation S2302, from the state transition log table 505a in FIG. 21, the analysis processing unit 503 retrieves and acquires a date and time in the column 902 that matches the following conditions (1) to (3) out of the state transition logs whose image forming apparatus ID in the column 901 matches the image forming apparatus ID in the column 802 of the current job log.

(1) just before the start date and time in the column 804 of the current job log;
(2) between the start date and time in the column 804 and the end date and time in the column 805 of the current job log; and
(3) just before the end date and time in the column 805 of the current job log.

The state transition log whose date and time in the column 902 is "(1) just before the start date and time in the column 804 of the current job log" indicates the first-retrieved state transition log in reverse chronological order from the start date and time in the column 804 of the current job log. In other words, it is the state transition log where the date and time in the column 902 is before the start date and time in the column 804 of the current job log and closest to the start date and time in the column 804 of the current job log. The state transition log whose date and time in the column 902 is "(3) just before the end date and time in the column 805 of the current job log" indicates the first-retrieved state transition log in reverse chronological order from the start date and time in the column 805 of the current job log. In other words, it is the state transition log where the date and time in the column 902 is before the end date and time in the column 805 of the current job log and closest to the end date and time in the column 805 of the current job log.

Thus, if a state transition log that matches the "(2) between the start date and time in the column 804 and the end date and time in the column 805 of the current job log" does not exist, the state transition log that matches the condition (1) will be the same as the state transition log that matches the condition (3). Further, if the state transition log does not exist, the state transition log that matches the conditions (1), (2), and (3) does not exist.

In operation S2303, the analysis processing unit 503 determines whether the state transition log in the condition (1) acquired in operation S2302 exists. If the analysis processing unit 503 determines that the state transition log in the condition (1) exists (YES in operation S2303), the processing proceeds to operation S2304. On the other hand, if the analysis processing unit 503 determines that the state transition log in the condition (1) does not exist (NO in operation S2303), the processing proceeds to operation S2310.

In operation S2304, the analysis processing unit 503 determines whether the state in the column 903 of the state transition log in the condition (1) acquired in operation S2302 is the "printing-related job in progress". If the analysis processing unit 503 determines that the state in the column 903 of the state transition log in the condition (1) is the "printing-related job in progress" (YES in operation S2304), the processing proceeds to operation S2305. If the analysis processing unit 503 determines that the state in the column 903 of the state transition log in the condition (1) is not the "printing-related job in progress" (NO in operation S2304), the processing proceeds to operation S2307.

In operation S2305, the analysis processing unit 503 determines whether the job type in the column 803 of the current job log is a printing-related job. If the analysis processing unit 503 determines that the job type in the column 803 of the current job log is a printing-related job (YES in operation S2305), the processing proceeds to operation S2313. If the analysis processing unit 503 determines that the job type in the column 803 of the current job log is not a printing-related job (NO in operation S2305), the processing proceeds to operation S2306.

In operation S2306, the analysis processing unit 503 changes the state of the transition log in the condition (1) in the column 2103 acquired in operation S2302 to "job in progress", and the processing proceeds to operation S2313.

In operation S2307, the analysis processing unit 503 determines whether the state in the column 903 of the state transition log in the condition (1) acquired in operation S2302 is the "job in progress". If the analysis processing unit 503 determines that the state in the column 903 of the state transition log in the condition (1) acquired in operation S2302 is the "job in progress" (YES in operation S2307), the processing proceeds to operation S2308. If the analysis processing unit 503 determines that the state in the column 903 of the state transition log in the condition (1) acquired in operation S2302 is not the "job in progress" (NO in operation S2307), the processing proceeds to operation S2310.

In operation S2308, the analysis processing unit 503 determines whether the job type in the column 803 of the current job log is a printing-related job. If the analysis processing unit 503 determines that the job type in the column 803 of the current job log is a printing-related job (YES in operation S2308), the processing proceeds to operation S2309. If the analysis processing unit 503 determines that the job type in the column 803 of the current job log is not a printing-related job (NO in operation S2308), the processing proceeds to operation S2313. In other words, if a job is started without an interval after a printing-related job is executed, a state transition log will not be added and the job will be included in the state transition log being "printing-related job in progress" of the job that is executed before the job.

In operation S2309, the analysis processing unit 503 changes the state in the column 903 of the state transition log in the condition (1) to the "printing-related job in progress", increments the printing-related job start number in the column 2101 by 1, and then the processing proceeds to operation S2313. Thus, if a job other than a printing-related job and a printing-related job are continuously executed, the state transition log of the "job in progress" is changed to the "printing-related job in progress" without adding a state transition log for the "printing-related job in progress". Accordingly, one state transition log of the "printing-related job in progress" is generated. Further, the printing-related job start number is incremented by "1".

In operation S2310, the analysis processing unit 503 determines whether the job type in the column 803 of the current job log is a printing-related job. If the analysis processing unit 503 determines that the job type in the column 803 of the current job log is a printing-related job (YES in operation S2310), the processing proceeds to operation S2311. If the analysis processing unit 503 determines that the job type in the column 803 of the current job log is not a printing-related job (NO in operation S2310), the processing proceeds to operation S2312.

In operation S2311, the analysis processing unit 503 generates a state transition log having the start date and time of the job log in the column 804 set in the date and time in the column 902, the "printing-related job in progress" set in the state in the column 903, and "1" set in the printing-related job start number in the column 2101, and stores the generated state transition log in the state transition log table illustrated in FIG. 21. Then, the processing proceeds to operation S2313. In other words, a state transition log of "printing-related job in progress" is added according to the start date and time of the printing-related job.

According to the processing in the above-described operations S2309 and S2311, whether a printing-related job is included in continuously-executed jobs is understood. Thus, whether the drum has been rotated or the fixing unit has been heated during the job processing is understood.

Further, in operation S2312, the analysis processing unit 503 generates a state transition log having the start date and time of the job log in the column 804 set in the date and time in the column 902, the "printing-related job in progress" set in the state in the column 903, and "0" set in the printing-related job start number in the column 2101, and stores the generated state transition log in the state transition log table illustrated in FIG. 21. Then, the processing proceeds to operation S2313. In other words, a state transition log of "job in progress" is added according to the start date and time of the job other than the printing-related job.

In operation S2313, the analysis processing unit 503 determines whether the state transition log in the condition (3) acquired in operation S2302 exists. If the analysis processing unit 503 determines that the state transition log in the condition (3) acquired in operation S1402 exists (YES in operation S2313), the processing proceeds to operation S2315. If the analysis processing unit 503 determines that the state transition log in the condition (3) acquired in operation S1402 does not exist (NO in operation S2313), the processing proceeds to operation S2314.

In operation S2314, the analysis processing unit 503 generates the state transition log in which the date and time in the column 902 is set to the end date and time in the column 805 of the current job log and the state in the column 903 is set to "in operation", and stores the generated state transition log in the state transition log table 505a. Then, the processing proceeds to operation S2317. In other words, a state transition log that changes the state to "in operation" at the job end date and time is added.

In operation S2315, the analysis processing unit 503 determines whether the state in the column 903 of the state transition log in the condition (3) acquired in operation S2302 is the "job in progress" or the "printing-related job in progress". If the analysis processing unit 503 determines that the state in the column 903 of the state transition log in the condition (3) is the "job in progress" or the "printing-related job in progress" (YES in operation S2315), the processing proceeds to operation S2317. If the analysis processing unit 503 determines that the state in the column 903 of the state transition log in the condition (3) is not the "job in progress" or the "printing-related job in progress" (NO in operation S2315), the processing proceeds to operation S2316.

In operation S2316, the analysis processing unit 503 generates the state transition log in which the date and time in the column 902 is set to the end date and time in the column 805 of the job log and the state in the column 903 is set to the "state of the state transition log in the condition (3)", and stores the generated state transition log in the state transition log table in FIG. 21. Then, the processing proceeds to operation S2317. In other words, if the power state notification is not received normally, the "state" may be set to "power off" or "transition to power saving". In this case, the state transition log is added so that the state is returned to the "state" of the state transition log just before the job end date and time at the job end date and time.

In operation S2317, the analysis processing unit 503 deletes the state transition log in the condition (2) acquired in operation S2302 from the state transition log table 505a. In other words, the state transition log based on other jobs which have been continuously executed will be deleted. Then, the processing proceeds to operation S2318.

In operation S2318, the analysis processing unit 503 determines whether there is a job log that has not undergone the processing in operations S2301 to S2318. If the analysis processing unit 503 determines that there is a job log that has not undergone the processing in operations S2301 to S2318, the processing returns to operation S2301. If the analysis processing unit 503 determines that all the job logs have undergone the processing in operations S2301 to S2318, the processing ends.

According to the above-described processing, the state "printing-related job in progress" or the "job in progress" may be added to the state transition log table 505a in FIG. 21. At that time, if execution of continuously-executed jobs that include a printing-related job is started and a different printing-related job is started before the continuously-executed jobs are finished, then these jobs as a whole will be recorded in the state transition log as one printing-related job ("printing-related job in progress").

Further, the number of times the processing, which is performed when the printing is started, is executed when the image forming apparatus is in the "printing-related job in progress" state may be added to the printing-related job start number in the column 2101. In this manner, if printing of a job including printing is started before a different job including printing is not yet completed, the number of execution times of the processing which is performed when the printing is started is calculated as once for the whole job.

Figure 24:
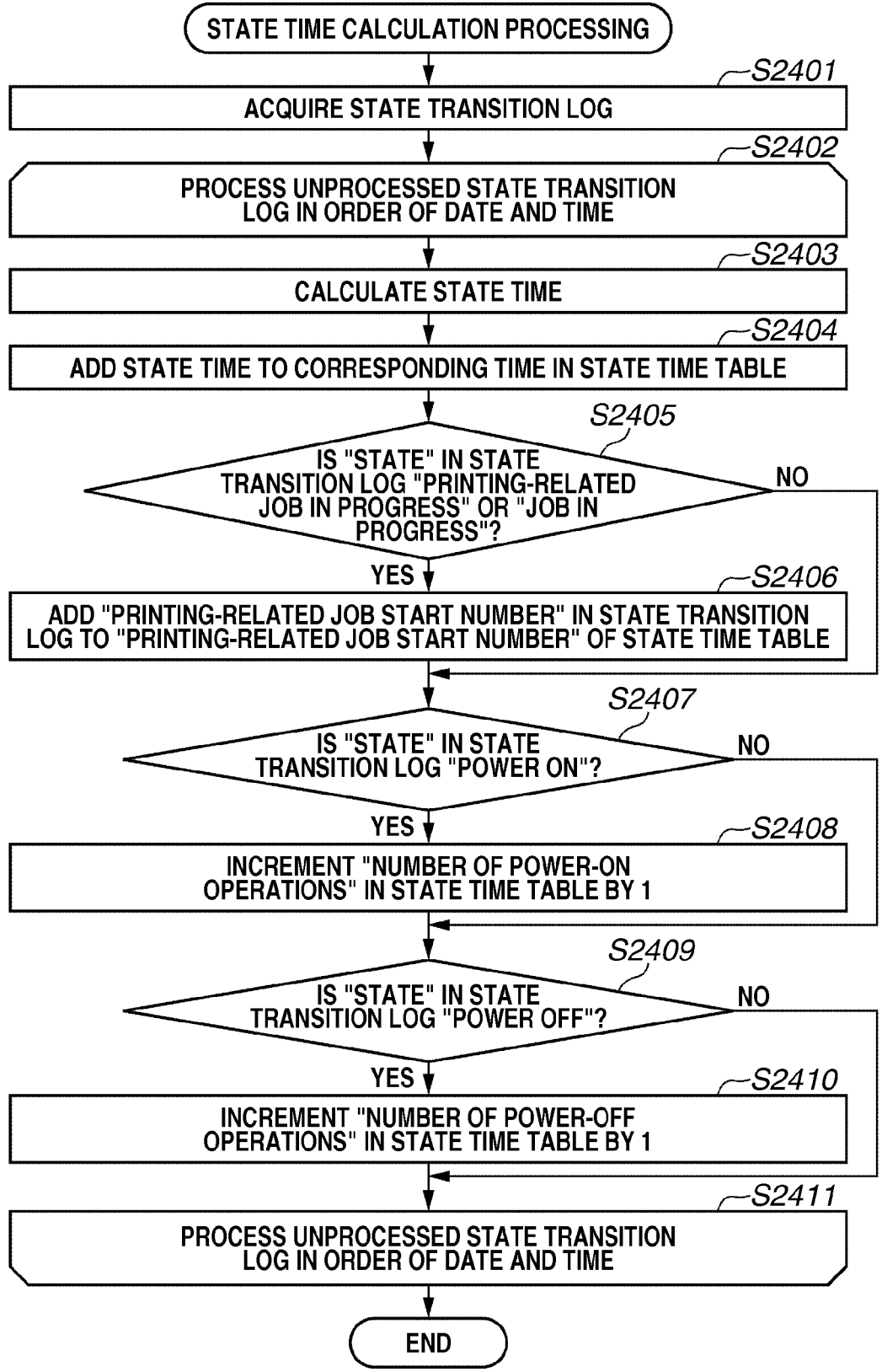
FIG. 24 is a flowchart illustrating an example of the state time calculation processing according to the second exemplary embodiment.

FIG. 24 is a flowchart illustrating an example of the state time calculation processing according to the second exemplary embodiment. The example is based on the state time calculation processing illustrated in FIG. 15 according to the first exemplary embodiment. The state time calculation processing is based on the state time calculation processing according to the first exemplary embodiment but further includes processing used for counting power on/off state transition log.

Each of operations S2401 to S2411 is realized by the CPU 201 of the analysis server 102 loading a control program from the HD 211 or the ROM 202 onto the RAM 203 and executing the program.

In operation S2401, when the state time calculation processing is started, the analysis processing unit 503 acquires a state transition log which has not undergone the state time calculation processing from the state transition log table 505a (FIG. 21) managed by the power state monitoring unit 505.

Next, the analysis processing unit 503 repeats the processing in operations S2402 to S2411 with respect to an unprocessed state transition log. When the analysis processing unit 503 performs the processing, the processing is controlled so that the state transition log is processed in the order of the start date and time. In operation S2402, from the state transition log acquired in operation S2401, the analysis processing unit 503 acquires one unprocessed state transition log (hereinafter referred to as a current state transition log), and the processing proceeds to operation S2403.

In operation S2403, the analysis processing unit 503 calculates the state time being the "job processing time", the "normal mode time", the "transition to power saving", and the "power off" according to the state transition log. The "job processing time" is time from when the state in the column 903 of the current state transition log is the "job in progress" or the "printing-related job in progress" to when the state is changed to a different state. The "normal mode time" is time from when the state is the "cancel power saving", the "power on", or the "in operation" to when the state is changed to a different state. The "power saving mode time" is time from when the state is the "transition to power saving" to when the state is changed to a different state. Further, the "power off time" is time from when the state is "power off" to when the state is changed to a different state.

In operation S2404, the analysis processing unit 503 adds the state time calculated in operation S2403 to the time of the corresponding rows 1003 to 1006 in the state time information in which the date of aggregate calculation in the column 1001 and the image forming apparatus ID in the column 1002 of the state time table 503b (see FIG. 22) match the date and time in the column 902 and the image forming apparatus ID in the column 901 of the current state transition log. If a corresponding row does not exist, a row is generated.

In operation S2405, the analysis processing unit 503 determines whether the state in the column 903 of the current state transition log is the "printing-related job in progress" or the "job in progress". If the analysis processing unit 503 determines that the state in the column 903 of the current state transition log is the "printing-related job in progress" or the "job in progress" (YES in operation S2405), the processing proceeds to operation S2406. If the analysis processing unit 503 determines that the state in the column 903 of the current state transition log is not the "printing-related job in progress" or the "job in progress" (NO in operation S2405), the processing proceeds to operation S2407.

In operation S2406, the analysis processing unit 503 increments the printing-related job start number in the column 1007 of the row where the state time information in which the date of aggregate calculation in the column 1001 and the image forming apparatus ID in the column 1002 of the state time table 503b match the date and time in the column 902 and the image forming apparatus ID in the column 901 of the current state transition log by the printing-related job start number in the column 2101 of the current state transition log.

According to this processing in operation S2406, the number of job processing operations including a printing-related job may be determined. In other words, the number of times a job including the rotation of the drum or the heating of the fixing unit has been performed may be acquired when a job is started.

In operation S2407, the analysis processing unit 503 determines whether the state in the column 903 of the current state transition log is "power on". If the analysis processing unit 503 determines that the state in the column 903 of the current state transition log is "power on" (YES in operation S2707), the processing proceeds to operation S2408. If the analysis processing unit 503 determines that the state in the column 903 of the current state transition log is not "power on" (NO in operation S2707), the processing proceeds to operation S2409.

In operation S2408, the analysis processing unit 503 increments the number of power-on operations in the column 2201 of the row where the state time information in which the date of aggregate calculation in the column 1001 and the image forming apparatus ID in the column 1002 of the state time table 503b match the date and time in the column 902 and the image forming apparatus ID in the column 901 of the current state transition log by "1".

In operation S2409, the analysis processing unit 503 determines whether the state in the column 903 of the current state transition log is "power off". If the analysis processing unit 503 determines that the state in the column 903 of the current state transition log is "power off" (YES in operation S2409), the processing proceeds to operation S2410. If the analysis processing unit 503 determines that the state in the column 903 of the current state transition log is not "power off" (NO in operation S2409), the processing proceeds to operation S2411.

In operation S2410, the analysis processing unit 503 increments the number of power-off operations in the column 2202 of the row where the state time information in which the date of aggregate calculation in the column 1001 and the image forming apparatus ID in the column 1002 of the state time table 503b match the date and time in the column 902 and the image forming apparatus ID in the column 901 of the current state transition log by "1".

In operation S2411, the analysis processing unit 503 determines whether there is a state transition log that has not undergone the processing in operations S2402 to S2411. If the analysis processing unit 503 determines that there is a state transition log that has not undergone the processing in operations S2402 to S2411, the processing returns to operation S2402. If the analysis processing unit 503 determines that there is a state transition log that has undergone the processing in operations S2402 to S2411, the processing ends.

Figure 25B:
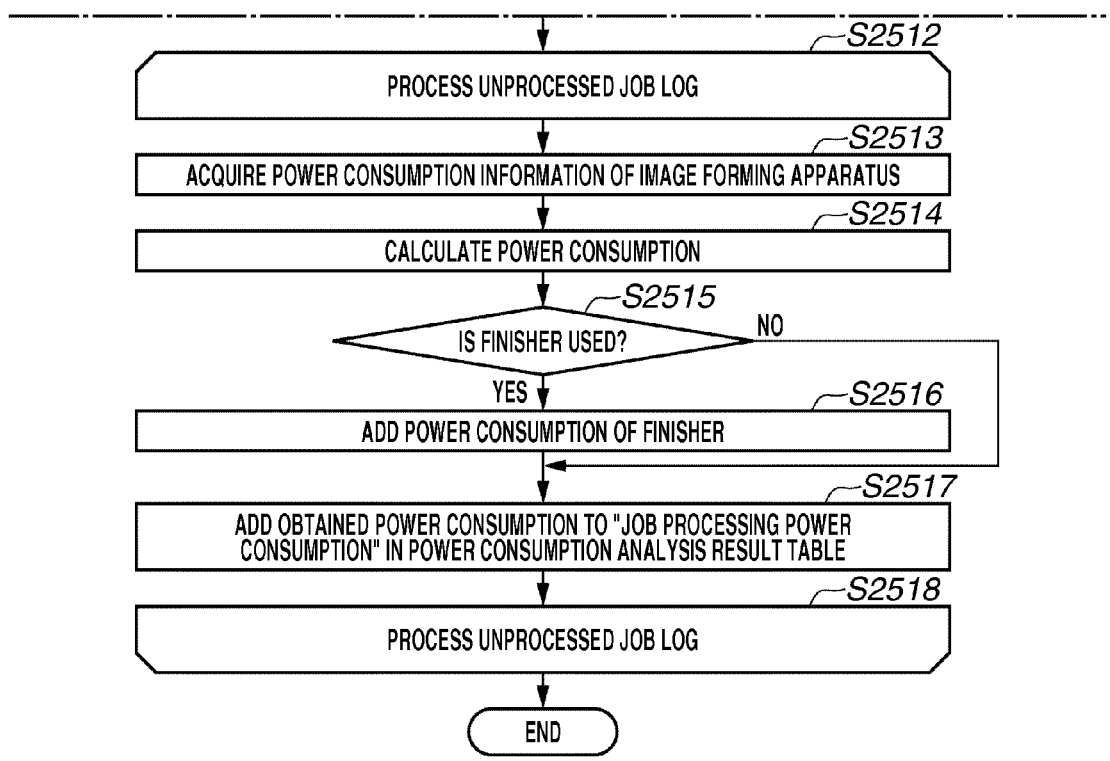
FIG. 25, composed of FIGS. 25A and 25B, is a flowchart illustrating an example of the power consumption calculation processing according to the second exemplary embodiment.

FIG. 25 is a flowchart illustrating an example of the power consumption calculation processing according to the second exemplary embodiment. The flowchart is based on the power consumption calculation processing according to the first exemplary embodiment illustrated in FIG. 16. According to the power consumption calculation processing of the present embodiment, processing for correcting the power consumption is added to the power consumption calculation processing according to the first exemplary embodiment. In other words, power consumption regarding power on/off and power consumption when the finisher is added to the power calculation processing.

Each of operations S2501 to S2518 is realized by the CPU 201 of the analysis server 102 loading a control program from the HD 211 or the ROM 202 onto the RAM 203 and executing the program.

In operation S2501, when the power consumption calculation processing is started, the analysis processing unit 503 acquires state time information of the job which has not undergone the power consumption calculation processing from the state time table 503b (FIG. 22) managed by the analysis processing unit 503.

Next, the analysis processing unit 503 repeats the processing in operations S2502 to S2511 with respect to state time information. In operation S2502, from the state time information acquired in operation S2501, the analysis processing unit 503 acquires unprocessed state time information (hereinafter referred to as current state time information), and the processing proceeds to operation S2503.

In operation S2503, the analysis processing unit 503 acquires from the image forming apparatus power consumption table 504a (see FIG. 19), the power consumption in the columns 703 to 707 and power consumption of each state of the finisher in the columns 1902 to 1907 in the power consumption information of an image forming apparatus whose ID in the column 701 matches the image forming apparatus ID in the column 1002, which is the ID of the image forming apparatus of the current state time information.

In operation S2504, the analysis processing unit 503 calculates the "job in progress power consumption", the "normal mode power consumption", the "power saving mode power consumption", and the "power off power consumption" by multiplying each time in the columns 1003 to 1006 of the current state time information converted into units of hours (h) by the power consumption in the columns 703 to 706 acquired in operation S2503.

In operation S2505, by using the configuration information of the image forming apparatus power consumption information in the column 1901, the analysis processing unit 503 determines whether the image forming apparatus includes a finisher. If the analysis processing unit 503 determines that the image forming apparatus includes a finisher (YES in operation S2505), the processing proceeds to operation S2506. If the analysis processing unit 503 determines that the image forming apparatus does not include a finisher (NO in operation S2505), the processing proceeds to operation S2507.

In operation S2506, the analysis processing unit 503 calculates the "job in progress power consumption", the "normal mode power consumption", the "power saving mode power consumption", and the "power off power consumption" in Wh by multiplying each time in the columns 1003 to 1006 of the current state time information converted into units of hours (h) by the power consumption of the finisher in the columns 1904 to 1907 in (W) acquired in operation S2503. Then, the analysis processing unit 503 adds the obtained power consumption of each state to the power consumption of each state acquired in operation S2504.

In operation S2507, the analysis processing unit 503 adds the power consumption calculated in operations S2504 to S2506 to the power consumption in the columns 1103 to 1106 and in the row where the date of aggregate calculation in the column 1001 and the image forming apparatus ID in the column 1002 in the current state time information match the month of aggregate calculation in the column 1101 and the image forming apparatus ID in the column 1102 in the electric power consumption analysis result table 503a (see FIG. 11).

In operation S2508, the analysis processing unit 503 multiplies the printing-related job start time power consumption acquired in operation S2503 in the column 707 by the printing-related job start number in the state time information in the column 1007. Then, the analysis processing unit 503 adds the obtained value to the job processing power consumption in the column 1103 and in the row where the date of aggregate calculation in the column 1001 and the image forming apparatus ID in the column 1002 in the current state time information match the month of aggregate calculation in the column 1101 and the image forming apparatus ID in the column 1102 in the electric power consumption analysis result table 503a (see FIG. 11).

According to the processing in operation S2508, the "printing-related job start time power consumption" is added for the power consumption corresponding to the number of times the rotation of the drum or the heating of the fixing unit have been performed. In this manner, the power consumption when a job is started is added and the accuracy of the power consumption is improved.

In operation S2509, the analysis processing unit 503 multiplies the power-on time power consumption acquired in operation S2503 in the column 1902 by the number of power-on operations in the state time information in the column 2201. Then, the analysis processing unit 503 adds the obtained value to the normal mode power consumption in the column 1104 and in the row where the date of aggregate calculation in the column 1001 and the image forming apparatus ID in the column 1002 in the current state time information match the month of aggregate calculation in the column 1101 and the image forming apparatus ID in the column 1102 in the electric power consumption analysis result table 503a (see FIG. 11).

According to this processing (number of power-on operations calculation processing) in operation S2509, the "power-on time power consumption" is added for the number corresponding to the number of power-on operations. In this manner, the power consumption when a power is turned on is added and the accuracy of the power consumption is improved. Further, although the power-on time power consumption is added to the power consumption in the normal mode according to the present exemplary embodiment, it may be added to the power consumption of other modes or recorded separately with other modes.

In operation S2510, the analysis processing unit 503 multiplies the power-off time power consumption acquired in operation S2503 in the column 1903 by the number of power-off operations in the state time information in the column 2202, and adds the obtained value to the power consumption in the normal mode in the column 1104 and in the row where the date of aggregate calculation in the column 1001 and the image forming apparatus ID in the column 1002 in the current state time information match the month of aggregate calculation in the column 1101 and the image forming apparatus ID in the column 1102 in the electric power consumption analysis result table 503a (see FIG. 11).

According to this processing (number of power-off operations calculation processing) in operation S2510, the "power-off time power consumption" is added for the number corresponding to the number of power-off operations. In this manner, the power consumption when a power is turned off is added and the accuracy of the power consumption is improved. Further, although the power-off time power consumption is added to the power consumption in the normal mode according to the present exemplary embodiment, it may be added to the power consumption of other modes or recorded separately with other modes.

In operation S2511, the analysis processing unit 503 determines whether there is state time information that has not undergone the processing in operations S2502 to S2511. If the analysis processing unit 503 determines that there is state time information that has not undergone the processing in operations S2502 to S2511, the processing returns to operation S2502. If the analysis processing unit 503 determines that all the state time information has undergone the processing in operations S2502 to S2511, the processing proceeds to operation S2512.

Next, the analysis processing unit 503 repeats the processing in operations S2512 to S2518 with respect to an unprocessed job log. The analysis processing unit 503 acquires one unprocessed job log from the job log table 502a (see FIG. 8) (hereinafter, current job log), and the processing proceeds to operation S2513.

In operation S2513, from the image forming apparatus power consumption table 504a (see FIG. 19), the analysis processing unit 503 acquires the power consumption in the columns 708 to 712 for each page in the image forming apparatus power consumption information, the stapling power consumption in the column 1908, and the punching power consumption in the column 1909 of an image forming apparatus whose image forming apparatus ID in the column 701 matches the image forming apparatus ID in the column 801 of the current job log.

For example, if the job type in the column 803 of the current job log is "print", the analysis processing unit 503 acquires the monochrome printing power consumption in the column 708, the color printing power consumption in the column 709, the stapling power consumption in the column 1908, and the punching power consumption in the column 1909, sets them as a monochrome page power consumption variable, a color page power consumption variable, a number of stapling, and a number of punching, and sets the scan page power consumption variable to "0".

Further, if the job type in the column 803 of the current job log is "copy", the monochrome copy power consumption in the column 710, the color copy power consumption in the column 711, the scanning power consumption in the column 712, the stapling power consumption in the column 1908, and the punching power consumption in the column 1909 are acquired and set as a monochrome page power consumption variable, a color page power consumption variable, a scanning page power consumption variable, a number of stapling, and a number of punching.

Further, if the job type in the column 803 of the current job log is "scan", the scanning power consumption in the column 712, the stapling power consumption in the column 1908, and the punching power consumption in the column 1909 are acquired and set as the scanning page power consumption variable, the number of stapling, the number of punching, and the monochrome page power consumption variable and the color page power consumption variable are set to "0".

In operation S2514, the analysis processing unit 503 multiplies the number of processed pages according to each job of the current job log (columns 806 to 808, 2001, and 2002) by the power consumption per page acquired in operation S2513 and obtains the "job in progress power consumption". The power consumption per page corresponding to the job acquired in operation S2513 is, for example, the above-described monochrome page power consumption variable, the color page power consumption variable, the scanning page power consumption variable, the number of stapling, and the number of punching.

In operation S2515, the analysis processing unit 503 determines whether the finisher has been used in the job processing according to the number of stapling in the column 2001 and the number of punching in the column 2002 of the job log. If the analysis processing unit 503 determines that the finisher has been used in the job processing (YES in operation S2515), the processing proceeds to operation S2516. If the analysis processing unit 503 determines that the finisher has not been used in the job processing (NO in operation S2515), the processing proceeds to operation S2517.

In operation S2516, the analysis processing unit 503 calculates the power consumption due to the stapling by multiplying the number of stapling in the column 2001 and the stapling power consumption in the column 1908, and adds the obtained value to the above-described "job in progress power consumption". Further, the analysis processing unit 503 calculates the power consumption due to the punching by multiplying the number of punching in the column 2002 and the punching power consumption in the column 1909, and adds the obtained value to the above-described "job in progress power consumption".

According to this processing in operation S2516, power consumption when stapling or punching is used in processing a job is added to the job in progress power consumption. Since the power consumption when the stapling or the punching is performed is added, the accuracy of the power consumption is improved. Further, although the power consumption when the stapling or the punching is performed is added to the power consumption of the job processing according to the present exemplary embodiment, power consumption of other modes may be added or power consumption of different modes may be separately recorded.

In operation S2517, the analysis processing unit 503 adds the calculated "job processing power consumption" to the job processing power consumption in the column 1103 in the row where the end date and time in the column 805 (or the start date and time in the column 804) and the image forming apparatus ID in the column 802 in the current state time information match the month of aggregate calculation in the column 1101 and the image forming apparatus ID in the column 1102 in the electric power consumption analysis result table 503a (see FIG. 11).

In operation S2518, the analysis processing unit 503 determines whether there is a job log which has not undergone the processing in operations S2512 to S2518. If the analysis processing unit 503 determines that there is a job log which has not undergone the processing in operations S2512 to S2518, the processing returns to operation S2512. If the analysis processing unit 503 determines that all the job logs have undergone the processing in operations S2512 to S2518, the processing ends.

According to the second exemplary embodiment, the number of times the drum has been rotated or the fixing unit has been heated may be counted more accurately. Further, since the power used when the power of the image forming apparatus is turned on/off, the power consumption of the finisher itself, and the power used when the function (e.g., stapling and punching) of the finisher is executed are considered, the calculation accuracy of the power consumption of the image forming apparatus may be improved.

Since the display screen of the power consumption analysis result graph is similar to the display screen according to the first exemplary embodiment (FIGS. 17 and 18), the description is not repeated.

As described above, according to the exemplary embodiments of the present invention, the power consumption of the image forming apparatus in more detailed states is calculated. Thus, the power consumption of the image forming apparatus in each state may be obtained in detail.

The above-described exemplary embodiments may be also realized with, for example, a system, an apparatus, a method, a program, or a storage medium. More specifically, the above-described exemplary embodiments may be applied to a system including a plurality of devices or an apparatus including a single device. Further, aspects of the present invention may be applied to a system including a plurality of devices, or to an apparatus including a single device.

Aspects of the present invention may also be realized by a computer of a system or apparatus (or devices such as a central processing unit (CPU) or microprocessor unit (MPU)) that reads out and executes a program or instructions recorded/stored on an article of manufacture having a memory device or a non-transitory storage medium to perform the functions of the above-described embodiment(s), and by a method, the operations of which are performed by a computer of a system or apparatus by, for example, reading out and executing a program or instructions recorded/stored on an article of manufacture having a memory device or a non-transitory storage medium to perform the functions of the above-described embodiment (s). For this purpose, the program is provided to the computer for example via a network or from a recording medium of various types serving as the memory device (e.g., computer-readable medium).

Disclosed aspects of the embodiments may be realized by an apparatus, a machine, a method, a process, or an article of manufacture that includes a non-transitory storage medium having a program or instructions that, when executed by a machine or a processor, cause the machine or processor to perform operations as described above. The method may be a computerized method to perform the operations with the use of a computer, a machine, a processor, or a programmable device. The operations in the method involve physical objects or entities representing a machine or a particular apparatus (e.g., image forming apparatuses). In addition, the operations in the method transform the elements or parts from one state to another state. The transformation is particularized and focused on calculating electric power consumption. The transformation provides a different function or use such as generating a display screen, correcting a calculated value of the electric power consumption, etc.

In addition, elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any optical, electromechanical, electromagnetic, or electronic devices. The term software generally refers to a logical structure, a method, a procedure, a program, a routine, a process, an algorithm, a formula, a function, an expression, etc. A software implementation typically includes realizing the above elements (e.g., logical structure, method, procedure, program) as instruction codes and/or data elements embedded in one or more storage devices and executable and/or accessible by a processor, a CPU/MPU, or a programmable device as discussed above. The term firmware generally refers to a logical structure, a method, a procedure, a program, a routine, a process, an algorithm, a formula, a function, an expression, etc., that is implemented or embodied in a hardware structure (e.g., flash memory). Examples of firmware may include microcode, writable control store, micro-programmed structure. When implemented in software or firmware, the elements of an embodiment may be the code segments to perform the necessary tasks. The software/firmware may include the actual code to carry out the operations described in one embodiment, or code that emulates or simulates the operations.

All or part of an embodiment may be implemented by various means depending on applications according to particular features, functions. These means may include hardware, software, or firmware, or any combination thereof. A hardware, software, or firmware element may have several modules or units coupled to one another. A hardware module/unit is coupled to another module/unit by mechanical, electrical, optical, electromagnetic or any physical connections. A software module/unit is coupled to another module by a function, procedure, method, subprogram, or subroutine call, a jump, a link, a parameter, variable, and argument passing, a function return, etc. A software module/unit is coupled to another module/unit to receive variables, parameters, arguments, pointers, etc. and/or to generate or pass results, updated variables, pointers, etc. A firmware module/unit is coupled to another module/unit by any combination of hardware and software coupling methods above. A hardware, software, or firmware module/unit may be coupled to any one of another hardware, software, or firmware module/unit. A module/unit may also be a software driver or interface to interact with the operating system running on the platform. A module/unit may also be a hardware driver to configure, set up, initialize, send and receive data to and from a hardware device. An apparatus may include any combination of hardware, software, and firmware modules/units.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-193002 filed Aug. 31, 2010, which is hereby incorporated by reference herein in its entirety.

What is claimed is:

1. An information processing apparatus for calculating electric power consumption of an image forming apparatus, the information processing apparatus comprising:
 a memory; and
 a processor in communication with the memory, the processor configured to execute the following steps:
 storing start time power consumption indicating electric power consumption of a starting process which is performed when a job of the image forming apparatus is started;
 collecting, from the image forming apparatus, job history including job information of each of jobs which the image forming apparatus has processed;
 calculating the electric power consumption in a job processing state in a designated period by using the job history;
 identifying a number of times the image forming apparatus has executed the starting process in the designated period based on the job history;
 correcting a value of the electric power consumption calculated by adding a value obtained by multiplying the start time power consumption by the identified number of times to the electric power consumption of the image forming apparatus in the job processing state; and
 generating a display screen used for displaying a circular chart illustrating a ratio of the electric power consumption of the one or a plurality of image forming apparatus in each state so that the circular chart is arranged in a position corresponding to each icon on a map image where an icon indicating an installation position of the image forming apparatus is arranged and a size of the circular chart corresponds to an amount of the electric power consumption of the image forming apparatus, and
 wherein, if the icon or the circular chart is designated, generating a detailed display screen used for displaying more detailed information of the electric power consumption of the image forming apparatus in each state corresponding to the designated icon or the designated circular chart in addition to display information on the display screen.

2. The information processing apparatus according to claim 1 further comprising acquiring electric power state of the image forming apparatus from the image forming apparatus,
 calculating state-specific power consumption of the image forming apparatus in the designated period by using the electric power state and the job history.

3. The information processing apparatus according to claim 2, further comprising calculating a total time of the image forming apparatus in each state in the designated period based on the electric power state and the job history;
 further storing state-specific power consumption indicating electric power consumption of the image forming apparatus in each state per unit time; and
 calculating electric power consumption in each state of the image forming apparatus in the designated period by multiplying the state-specific power consumption by the total time of the image forming apparatus in each state.

4. The information processing apparatus according to claim 1, wherein the job history includes information of a number of pages of each job type as the job information,
 further storing operation-specific power consumption indicating electric power consumption of each job type per page of a job processed by the image forming apparatus, and
 adding a total value of each value obtained by multiplying the operation-specific power consumption by the number of pages of each job type of each job executed in the designated period of the image forming apparatus based on the job history to the electric power consumption of the image forming apparatus in the job processing state.

5. The information processing apparatus according to claim 2, further comprising identifying a power on number indicating a number of times power of the image forming apparatus is turned on in the designated period based on the electric power state,
 wherein the electric power consumption in each state of the image forming apparatus includes electric power consumption of the image forming apparatus in a standby state,
 storing power-on time power consumption indicating electric power consumption of processing of the image forming apparatus when power of the image forming apparatus is turned on, and
 adding a value obtained by multiplying the power-on time power consumption by the power on number to the electric power consumption in the standby state.

6. The information processing apparatus according to claim 5, further comprising identifying a power off number indicating a number of times power of the image forming apparatus is turned off in the designated period based on the electric power state,
 storing power-off time power consumption indicating electric power consumption of processing of the image forming apparatus when power of the image forming apparatus is turned off, and adding a value obtained by multiplying the power-off time power consumption by the power off number to the electric power consumption in the standby state.

7. The information processing apparatus according to claim 3, further comprising storing configuration information including information of a finisher included in the image forming apparatus and electric power consumption of the finisher in each state in advance, and adding a value obtained by multiplying the electric power consumption of the finisher in each state by a total time of the finisher in each state to the electric power consumption in each state.

8. The information processing apparatus according to claim 7, wherein the job history includes information of a number of pages of each finisher function of the finisher processed by the job, storing finisher function-specific power consumption indicating electric power consumption of each finisher function per page of a job executed by the finisher, and correcting the electric power consumption of the job processing by adding a value obtained by multiplying the finisher function-specific power consumption by the number of pages of each finisher function to the electric power consumption of the image forming apparatus in the job processing state.

9. The information processing apparatus according to claim 8, wherein the finisher function includes a stapling function and a punching function.

10. The information processing apparatus according to claim 1, wherein the job information includes start time information and end time information, and identifying that the number of times the starting process has been executed is once for the whole job, when, before a job corresponding to job information included in the job history has been completed, a different job corresponding to job information included in the job history has been started.

11. A method for calculating electric power consumption of an image forming apparatus, the method comprising:

collecting, from the image forming apparatus, job history including job information of each of jobs which the image forming apparatus has processed;

calculating electric power consumption of the image forming apparatus in a job processing state in a designated period by using the job history;

identifying a number of times the image forming apparatus has executed the starting process in the designated period based on the job history;

correcting the calculated value of the electric power consumption by adding a value obtained by multiplying start time power consumption indicating power consumption of the image forming apparatus when a job is started by the identified number of times to the electric power consumption of the image forming apparatus in the job processing state; and generating a display screen used for displaying a circular chart illustrating a ratio of the electric power consumption of the one or a plurality of image forming apparatus in each state so that the circular chart is arranged in a position corresponding to each icon on a map image where an icon indicating an installation position of the image forming apparatus is arranged and a size of the circular chart corresponds to an amount of the electric power consumption of the image forming apparatus, and wherein, if the icon or the circular chart is designated, the generation unit generates a detailed display screen used for displaying more detailed information of the electric power consumption of the image forming apparatus in each state corresponding to the designated icon or the designated circular chart in addition to display information on the display screen.

12. A non-transitory computer-readable storage medium storing a program that, when executed by a machine or processor, causes the machine or processor to perform operations for calculating electric power consumption of one or a plurality of image forming apparatuses, the operations comprising:

collecting, from the image forming apparatus, job history including job information of each of jobs which the image forming apparatus has processed;

calculating electric power consumption of the image forming apparatus in a job processing state in a designated period by using the job history;

identifying a number of times the image forming apparatus has executed the starting process in the designated period based on the job history;

correcting the calculated value of the electric power consumption by adding a value obtained by multiplying start time power consumption indicating power consumption of the image forming apparatus when the printing is started by the identified number of times to the electric power consumption of the image forming apparatus in the job processing state; and generating a display screen used for displaying a circular chart illustrating a ratio of the electric power consumption of the one or a plurality of image forming apparatus in each state so that the circular chart is arranged in a position corresponding to each icon on a map image where an icon indicating an installation position of the image forming apparatus is arranged and a size of the circular chart corresponds to an amount of the electric power consumption of the image forming apparatus, and wherein, if the icon or the circular chart is designated, the generation unit generates a detailed display screen used for displaying more detailed information of the electric power consumption of the image forming apparatus in each state corresponding to the designated icon or the designated circular chart in addition to display information on the display screen.

* * * * *